(12) United States Patent
Bledowski et al.

(10) Patent No.: US 12,346,067 B2
(45) Date of Patent: Jul. 1, 2025

(54) ILLUMINATION SYSTEM AND METHOD

(71) Applicant: Envisics Ltd, Milton Keynes (GB)

(72) Inventors: Ian Bledowski, Milton Keynes (GB); Konstantin Deichsel, Milton Keynes (GB); Neil Collings, Milton Keynes (GB); Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 17/253,575

(22) PCT Filed: Jul. 26, 2019

(86) PCT No.: PCT/EP2019/070194
§ 371 (c)(1),
(2) Date: Dec. 17, 2020

(87) PCT Pub. No.: WO2020/025480
PCT Pub. Date: Feb. 6, 2020

(65) Prior Publication Data
US 2021/0149341 A1 May 20, 2021

(30) Foreign Application Priority Data

Aug. 2, 2018 (GB) ..................... 1812590
Aug. 2, 2018 (GB) ..................... 1812593

(51) Int. Cl.
*G03H 1/22* (2006.01)
*G03H 1/02* (2006.01)
*G03H 1/08* (2006.01)

(52) U.S. Cl.
CPC ........... *G03H 1/2294* (2013.01); *G03H 1/024* (2013.01); *G03H 1/0841* (2013.01);
(Continued)

(58) Field of Classification Search
CPC .... G03H 1/2294; G03H 1/024; G03H 1/0841; G03H 1/2205; G03H 2001/0212;
(Continued)

(56) References Cited

U.S. PATENT DOCUMENTS 10,393,501 B2   8/2019  Knüttel
2006/0250933 A1* 11/2006 Asada ................. G11B 7/1275
(Continued)

FOREIGN PATENT DOCUMENTS

CN      1688943 A     10/2005
CN    102570271 A      7/2012
(Continued)

OTHER PUBLICATIONS

United Kingdom combined search and examination report dated Feb. 1, 2019 for Great Britain Application No. 1812590.6, 6 pages.
(Continued)

*Primary Examiner* — Audrey Y Chang
(74) *Attorney, Agent, or Firm* — McDonnell Boehnen Hulbert & Berghoff LLP

(57) ABSTRACT

An illumination system is arranged to output a light beam for illuminating a scene. The system comprises a spatial light modulator arranged to receive incident light, and to output light comprising a first component and a second component. The first component comprises incident light that is output without modulation by the spatial light modulator. The second component comprises incident light that is spatially-modulated according to a hologram and output by the spatial light modulator. A control device is operable to control the proportion of light output by the spatial light modulator that corresponds to the second component.

16 Claims, 14 Drawing Sheets

(52) U.S. Cl.
CPC ... *G03H 1/2205* (2013.01); *G03H 2001/0212* (2013.01); *G03H 2222/13* (2013.01); *G03H 2222/15* (2013.01); *G03H 2222/20* (2013.01); *G03H 2222/31* (2013.01); *G03H 2223/24* (2013.01); *G03H 2225/33* (2013.01); *G03H 2240/42* (2013.01); *G03H 2240/51* (2013.01)

(58) Field of Classification Search
CPC ........... G03H 2222/13; G03H 2222/15; G03H 2222/20; G03H 2222/31; G03H 2223/24; G03H 2225/33; G03H 2240/42; G03H 2240/51
USPC ................................. 359/9, 15, 32
See application file for complete search history.

(56) References Cited

U.S. PATENT DOCUMENTS

| | | | |
|---|---|---|---|
| 2007/0097501 A1* | 5/2007 | Stern | H04N 9/3129 348/E9.026 |
| 2008/0198429 A1 | 8/2008 | Uno | |
| 2009/0021814 A1 | 1/2009 | Chen | |
| 2009/0316240 A1 | 12/2009 | Hara | |
| 2011/0002019 A1* | 1/2011 | Routley | H04N 9/3111 353/38 |
| 2011/0181929 A1* | 7/2011 | Matsumoto | B23K 26/0643 359/15 |
| 2012/0256879 A1 | 10/2012 | Liu | |
| 2014/0293386 A1* | 10/2014 | Choi | G03H 1/2286 359/9 |
| 2015/0009547 A1 | 1/2015 | Ngcobo | |
| 2015/0009695 A1 | 1/2015 | Christmas et al. | |
| 2016/0295178 A1 | 10/2016 | Damberg | |
| 2017/0017076 A1 | 1/2017 | Guillon | |
| 2017/0115627 A1 | 4/2017 | Christmas | |
| 2017/0184270 A1* | 6/2017 | Kim | F21S 43/235 |

FOREIGN PATENT DOCUMENTS

| | | |
|---|---|---|
| GB | 2 499 579 | 8/2013 |
| GB | 2 554 575 | 4/2018 |
| JP | 2007179595 A | 7/2007 |

OTHER PUBLICATIONS

International Search Report and Written Opinion mailed Oct. 2, 2019 for International Application No. PCT/EP2019/070194, 12 pages.

* cited by examiner

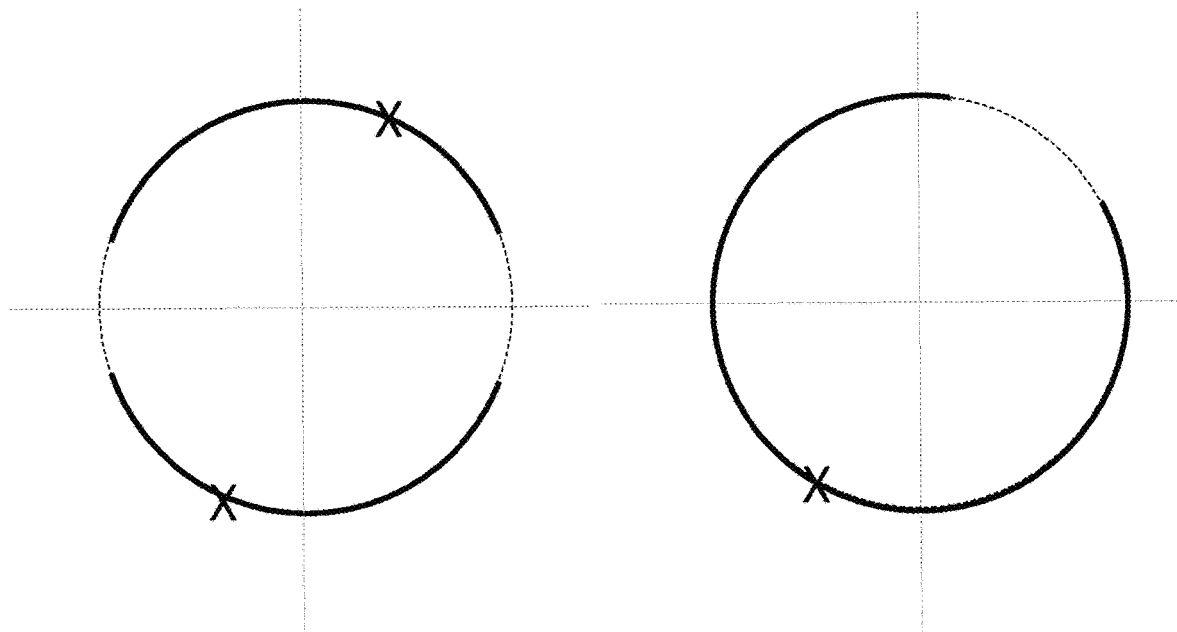
FIGURE 10A
FIGURE 10B
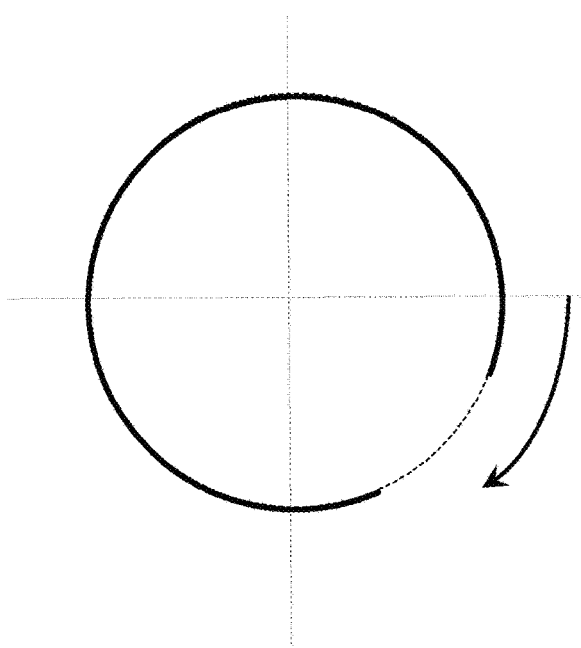
FIGURE 10C

ILLUMINATION SYSTEM AND METHOD

CROSS-REFERENCE TO RELATED APPLICATIONS

This application is a U.S. national phase application of International Patent Application no. PCT/EP2019/070194 filed on Jul. 26, 2019, which claims the benefit of United Kingdom Patent Applications nos. 1812590.6, filed on Aug. 2, 2018; and 1812593.0, filed on Aug. 2, 2018.

FIELD

The present disclosure relates to an illumination system. More specifically, the present disclosure relates to an illumination system comprising a holographic system. Some embodiments relate to a vehicle headlamp, spotlight or other lighting device comprising an illumination system for providing controlled light illumination.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM in transmission.

A holographic projection system for a lighting device may be provided using the above-described technology. For example, granted British patent GB2499579B concerns a lighting device, in the form of a vehicle headlamp, arranged to provide a controllable light beam for illuminating a scene. The vehicle headlamp comprises an SLM-based holographic system, which forms a holographic reconstruction, using a hologram displayed on the SLM, at a replay field. A projection lens projects the holographic reconstruction onto a scene, such as onto a road ahead of the vehicle headlamp. The projected holographic reconstruction provides a light distribution (or "beam"), which may be controlled—e.g. moved or reshaped—by dynamically changing the hologram.

In the lighting device described in GB2499579B, the light distribution produced is the holographic reconstruction formed in the zero order replay field diffracted from the SLM. In particular, the zero order replay field is used as the primary illuminating component of the headlamp, that is it provides the "low beam" of the vehicle headlamp that is continuously provided when the headlamp is switched on. The use of zero order replay field in SLM-based systems to form the holographic reconstruction may be optimal because it has higher intensity compared to lower intensity higher order replay fields. In addition, in the lighting device described in GB2499579B, the light distribution comprising the projected holographic reconstruction may be supplemented to provide a "high beam" (or "full beam"), for example by using the higher order replay fields as secondary illumination components, to increase intensity or create wide-angle illumination of the road, for example. Furthermore, the beam of the lighting device may be controlled, for example to selectively illuminate street furniture or signs, by dynamically changing the hologram.

Holographic systems using a pixelated display device suffer from the problem of zero order unmodulated light or "optical noise". Zero order unmodulated light is formed from specularly reflected (i.e. undiffracted) light from the SLM, and is generally focused at the focal point of the Fourier transform lens of the SLM-based system used to produce the holographic reconstruction. Thus, the zero order undiffracted light forms a bright spot at the centre of each replay field as an unmodulated spot, often referred to as the "DC spot". Conventionally, the DC spot is blocked out, for example by replacing it with a dark spot, since it does not form part of the holographic reconstruction. However, in the lighting device of GB2499579B, the DC spot of the zero order replay field may be used to provide secondary illumination, in the form of increased illumination at the centre of the beam.

The light distribution produced by the lighting device of GB2499579B is formed almost entirely from the hologram. The hologram therefore provides the main component of illumination. This can be demanding on the holographic system. In particular, in order to provide wide and uniform illumination, such as in the form of a light beam of a vehicle headlamp, most points in the replay field will receive light. It is found that this is computationally demanding and leads to reduced image quality. In particular, the holographic reconstruction can become noisy and it can be difficult to form well-defined shapes, leading to the possibility of glare to other road users due to the poorly defined (e.g. blurry) headlamp pattern.

The present disclosure addresses at least some of these problems.

There is disclosed herein an improved illumination system comprising a holographic system. A method of operating an illumination system is also disclosed.

SUMMARY

Aspects of the present disclosure are defined in the appended claims.

An illumination system arranged to output a light beam for illuminating a scene is provided. The illumination system comprises a spatial light modulator arranged to receive incident light and to output light comprising a first component and a second component. The first component comprises incident light that is output without modulation by the spatial light modulator. The second component comprises incident light that is spatially-modulated according to a hologram and output by the spatial light modulator. The illumination system comprises a control device operable to control the proportion of light output by the spatial light modulator that corresponds to the second component.

In embodiments, the illumination system further comprises projection optics arranged to project the light output by the spatial light modulator as the light beam for illuminating the scene.

In embodiments, the illumination system is operable in first and second illumination modes. In the first illumination mode, the control device operates so that substantially 0% of the light output by the spatial light modulator corresponds to the second component. In this way, only the first component, corresponding to unmodulated light (also known as "zero order undiffracted light" or "DC Spot") is output by the spatial light modulator and so contributes to the light beam. In the second illumination mode, the control device operates so that a selected proportion of the light output by the spatial light modulator corresponds to the second component, whilst the remaining proportion of output light corresponds to the first component. In this way, the second component, corresponding to the spatially modulated light, is output as a holographic reconstruction by the spatial light modulator, and the holographic reconstruction contributes to at least part of the light beam.

Accordingly, in embodiments, the control device is operable to adjust the ratio of the first and second components so that, in the second illumination mode, a proportion of the light output by the spatial light modulator corresponds to the second component. The remaining proportion of the light output by the spatial light modulator corresponds to the first component. Thus, the second illumination mode introduces holographic content (i.e., an image formed by holographic reconstruction) to the beam produced in the first illumination mode, and thus the illumination system may produce a light beam having a selected shape, size and/or form. The light beam produced in the second illumination mode may be referred to as the "holographic beam" or "holographic content".

A method for providing light illumination is provided. The method comprises providing incident light to a spatial light modulator of an illumination system. The spatial light modulator is arranged to output light comprising a first component and a second component. The first component corresponds to incident light that is output without modulation by the spatial light modulator and the second component corresponds to incident light that is spatially-modulated according to a hologram and output by the spatial light modulator. The method further comprises producing, by the spatial light modulator, output light for providing the illumination. The method further comprises controlling the illumination system so that a proportion of the light output by the spatial light modulator corresponds to the second component.

Reference is made throughout this disclosure to a "DC spot" or "unmodulated" spot of light in the replay field. The terminology DC spot is used to refer to the spot of light at the centre of each replay field which is a formed by focusing to a point light which does not contribute to the image content in the replay field—that is, does not contribute to the light field formed by interference of the spatially-modulated light. The DC spot includes, for example, light which is reflected by the inter-pixel regions of the spatial light modulator. The disclosed spatial light modulator comprises a 2D array of pixels which itself has a diffractive effect. Specifically, higher order replay fields are formed wherein each higher order replay field is a duplicate of the primary or zero order replay field. Each replay field has a DC spot at the centre. Each replay field may also comprise a conjugate image. Typically, only the zero order replay field is used and the higher order replay fields are removed from the system such as by masking or baffling. The present disclosure describes devices and methods which utilise the DC spot in the zero order replay field which may be referred to as the "zero order DC spot".

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Reference is made herein to the proportion of light having a particular polarisation and, more specifically, changing the proportion of light having a particular polarisation. Such reference is made as shorthand for referring to the component of linearly polarised light in a particular direction and changing the component of linearly polarised light in the particular direction. The meaning of such shorthand is well-understood in the art and the reader will be very familiar with how wave plates, such as rotatable half-wave plates, use birefringent material to shift the phase between the two perpendicular components of a light wave to effectively change the proportion of light polarised in each perpendicular direction.

References herein to coherence of light relate to the coherence length of light. In particular, incident light on an SLM is considered as coherent when it has a long enough coherence length such that a holographic reconstruction can be formed. Conversely, incident light on an SLM is considered as incoherent (or "non-coherent") when its coherence length is not long enough for a holographic reconstruction to be formed (even though the light may have been modulated by the SLM).

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 10A illustrates a truncated range of an allowable set of phase modulation levels, similar to FIG. 8A, with balanced truncation;

FIG. 10B illustrates a truncated range of an allowable set of phase modulation levels, similar to FIGS. 10A, with an unbalanced truncation;

FIG. 10C illustrates a truncated range of an allowable set of phase modulation levels, similar to FIGS. 10B, with an unbalanced truncation using a multiplier.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
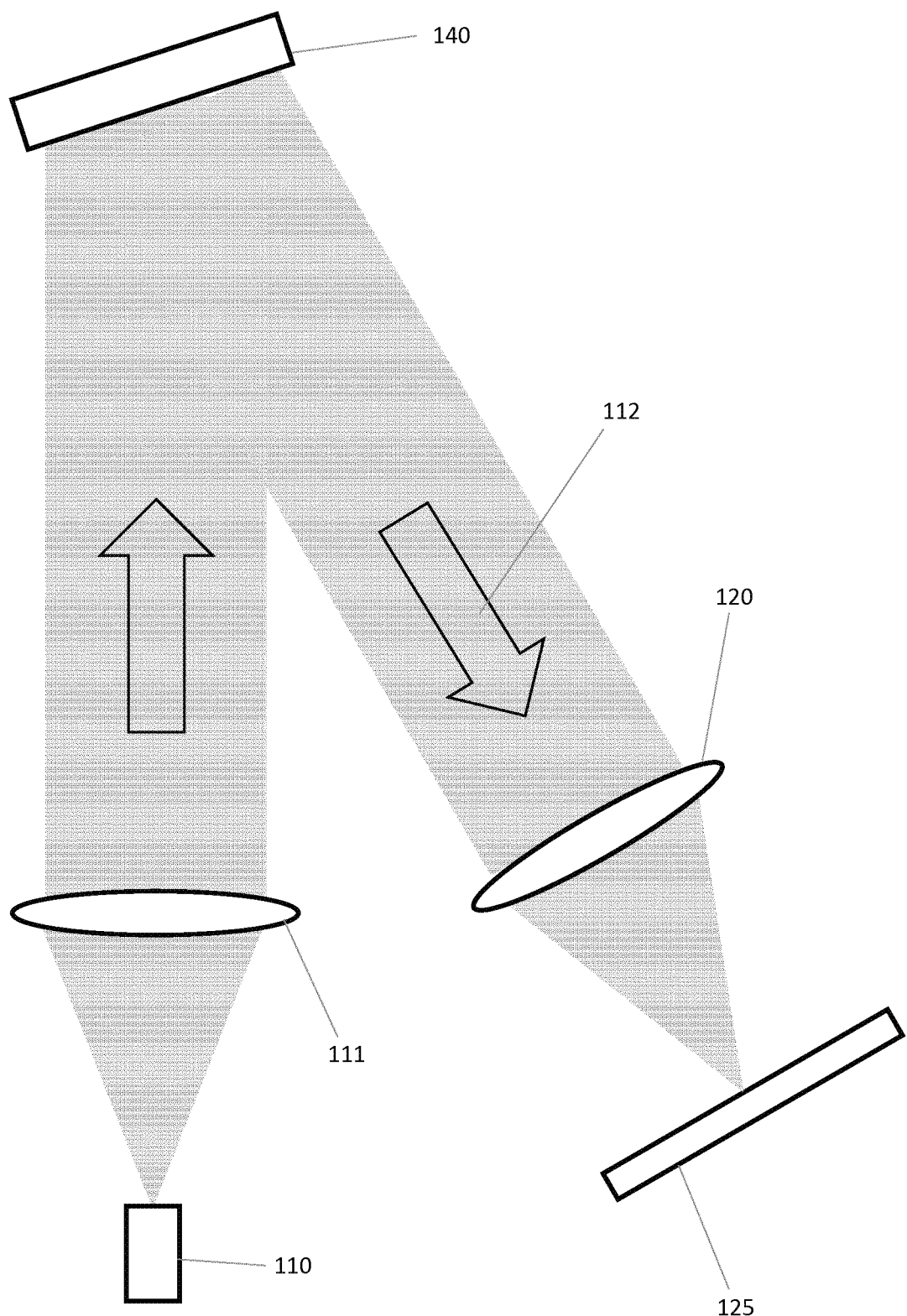
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [U, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
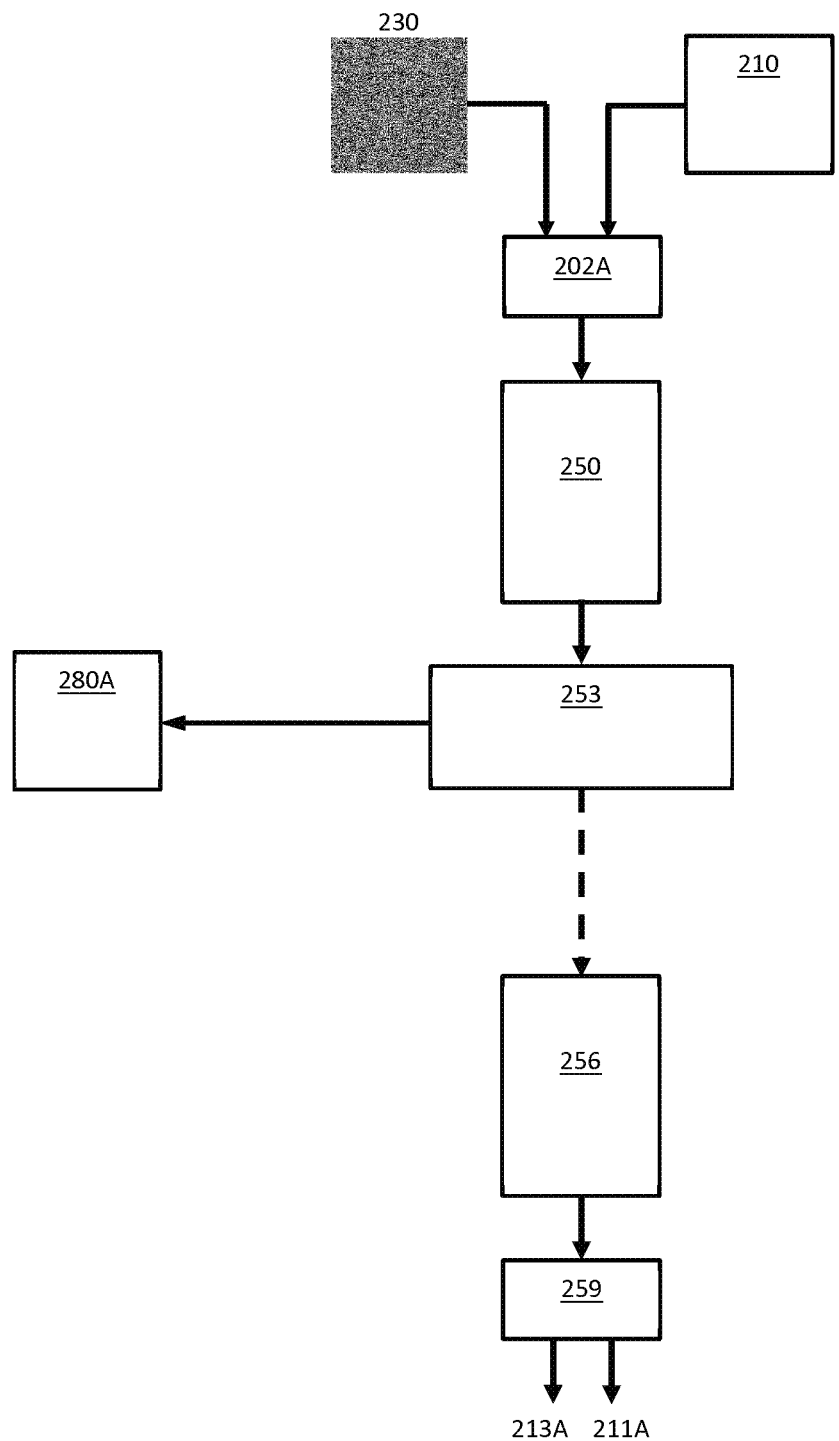
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain. First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or pre-set or user-defined.

Figure 2B:
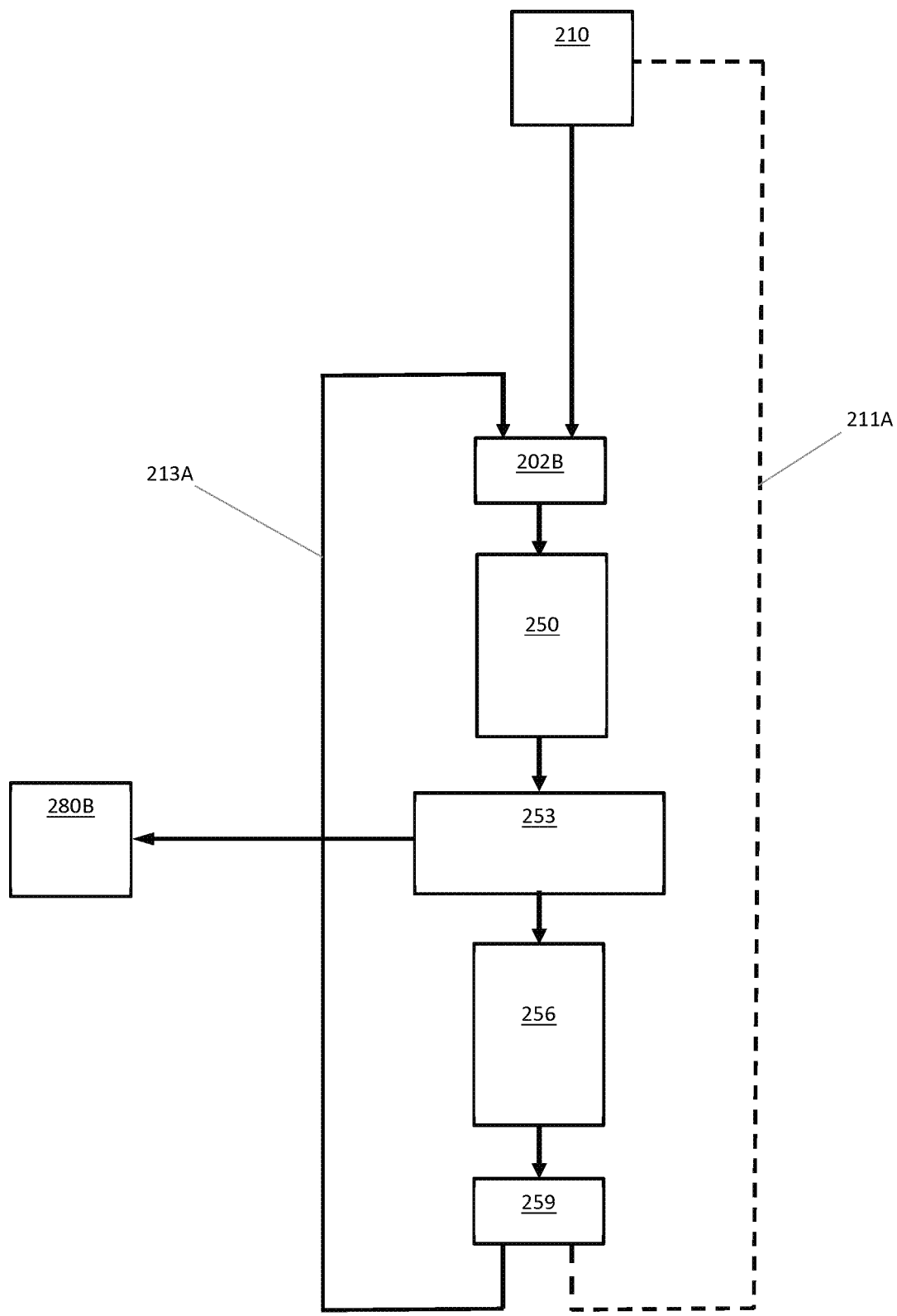
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
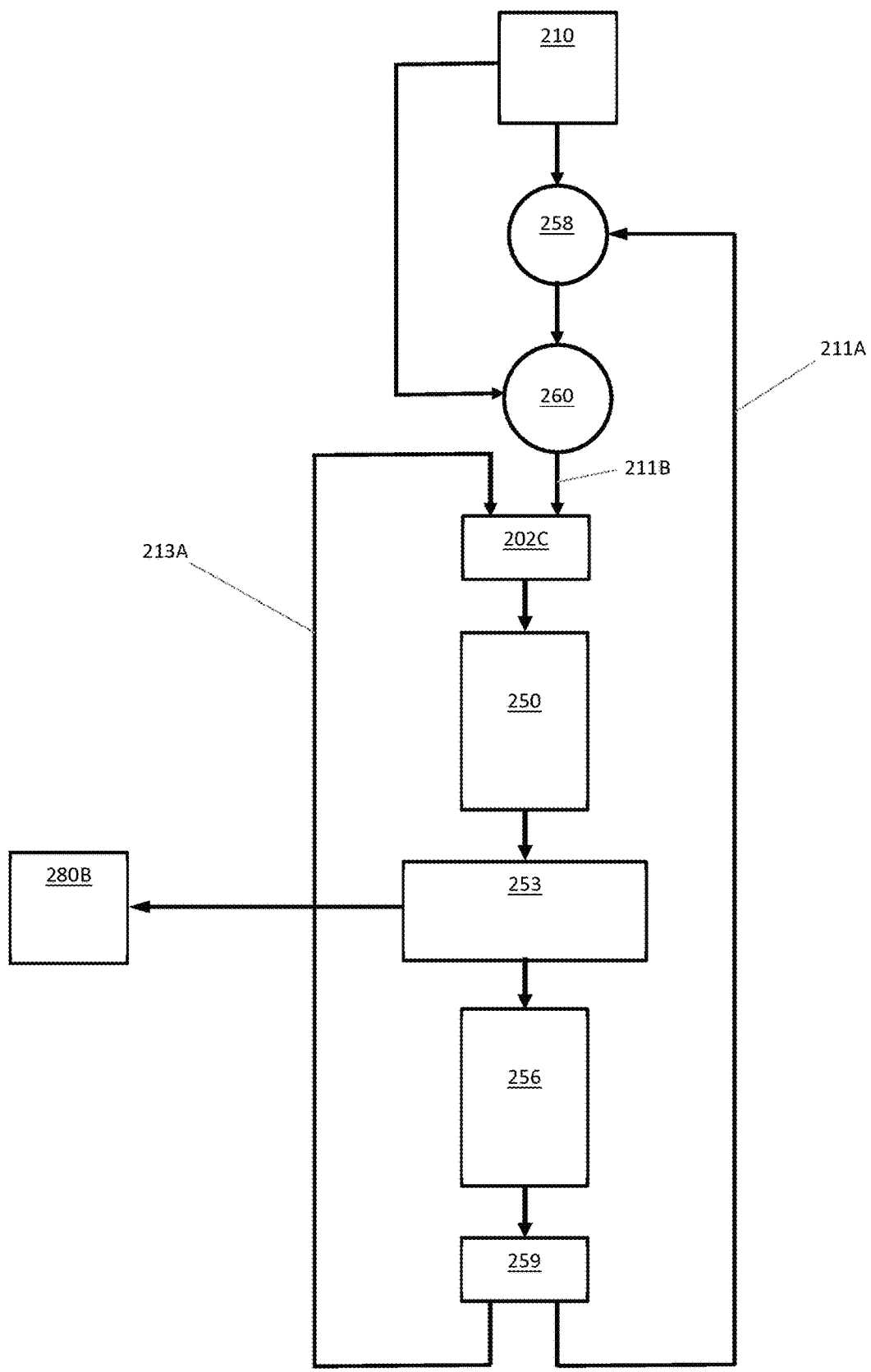
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor a and subtracts the scaled difference from the input image 210. This is expressed mathematically by the following equations, wherein the subscript text and numbers indicate the iteration number:

$$R_{n+1}[x, y]=F'\{\exp(i\ \psi_n[u, v])\}$$

$$\psi_n[u, v]=\angle F\{\eta\cdot\exp(i\angle R_n[x, y])\}$$

$$\eta=T[x, y]-\alpha(|R_n[x, y]|-T[x, y])$$

where:
F' is the inverse Fourier transform;
F is the forward Fourier transform;
R[x, y] is the complex data set output by the third processing block 256;
T[x, y] is the input or target image;
φ is the phase component;
ψ is the phase-only hologram 280B;
η is the new distribution of magnitude values 211B; and
α is the gain factor.

The gain factor a may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator (SLM) but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
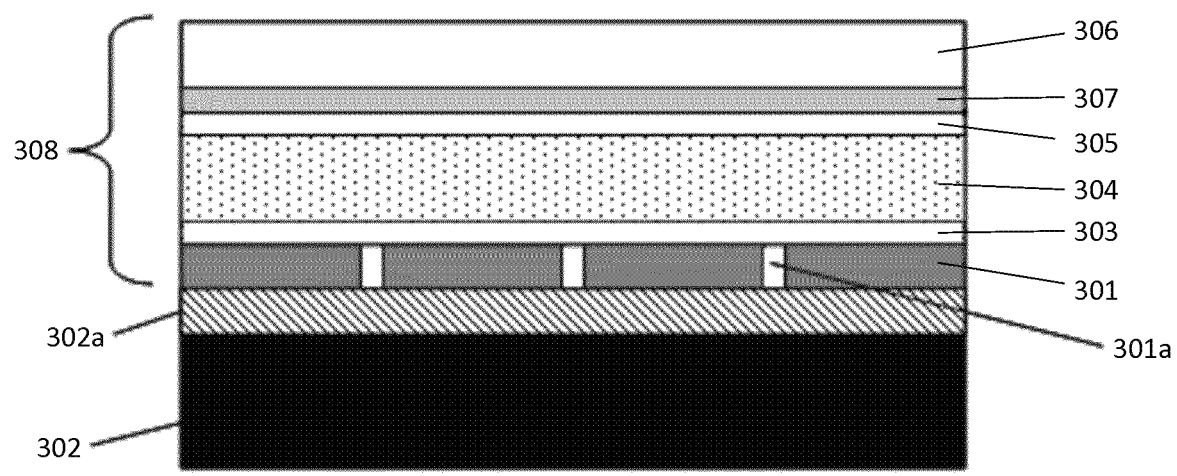
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Illumination System I

Figure 4:
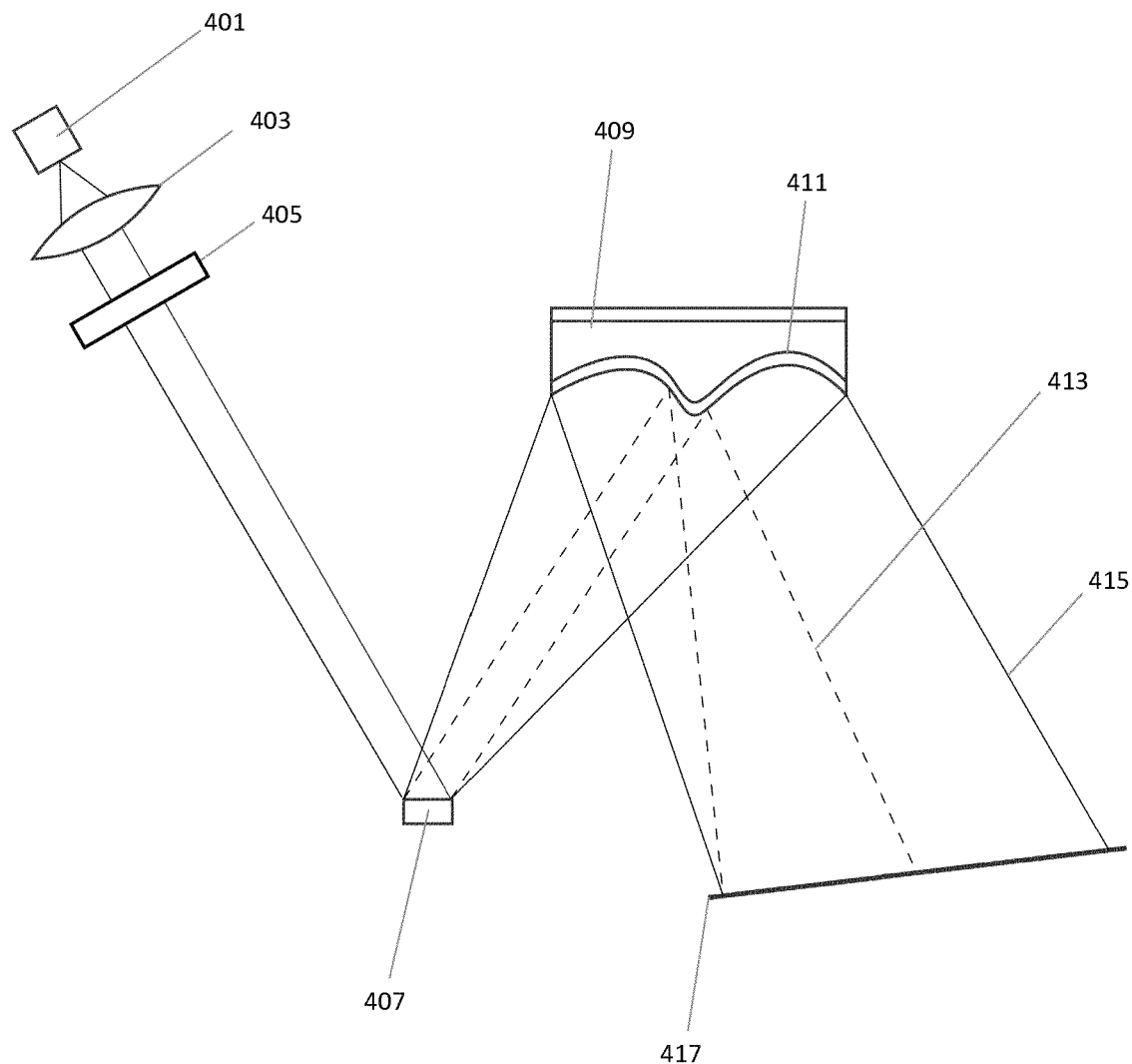
FIG. 4 shows an illumination system in accordance with embodiments.

FIG. 4 shows an illumination system in accordance with embodiments. The illumination system comprises an SLM-based system, which may be controlled to output light as described below. The output light is projected by projection optics as a light beam for illuminating a scene.

In particular, the illumination system comprises a light source 401, for example a blue laser diode, arranged to illuminate an SLM 407. A collimating lens 403 is arranged so that a generally planar wavefront is formed as the incident light on the SLM 407. In the illustrated arrangement, SLM 407 is a reflective SLM and the direction of the wavefront of incident light is off-axis (e.g. two or three degrees away from orthogonal to the SLM). Thus, the incident light is reflected by a rear reflective surface of the SLM 407 to form an exit wavefront in a direction, which is likewise off-axis, towards projection optics 407. In other embodiments, SLM 407 may be a transmissive SLM, which transmits incident light instead of reflecting incident light. Embodiments comprising a transmissive SLM 407 may also be arranged as on-axis system. An on-axis system arrangement with a reflective SLM is also possible, for example by including a beam splitter between the collimating lens 403 and a reflective SLM 407. Accordingly, references herein to "output light" of an SLM are intended to encompass light output by transmission or reflection, as appropriate. The projection optics comprise a shaped reflector 409, optionally having a phosphor coating 411, for forming a shaped light beam 413, 415 as described further below. The phosphor coating 411 is used in conjunction with a blue light source 401, such as a blue laser diode, to convert blue light output from the SLM 407 into white light to form the light beam, as well known in the art. Other arrangements for forming the shaped light beam 423, 425, for example using a transmissive or reflective planar phosphor element in conjunction with a shaped reflector and/or structured lens, are possible.

The behaviour of the SLM 407 is dependent on at least one property of the light incident thereon. It may be said that the SLM 407 is sensitive to at least one property of the light incident thereon. In particular, SLM 407 is arranged to spatially modulate the component of the incident light that has a certain property state (e.g. having a value or value range for the property), whilst outputting the component of the incident light that has other property states (e.g., having other values for the property) without modulation. For example, a LCOS SLM may be polarisation sensitive. In particular, the liquid crystal material of the pixels of such an LCOS SLM is only able to modulate light, or the component of light, which is linearly polarised in a particular (or "necessary") direction (e.g., horizontal or vertical direction). Thus, in such an LCOS-based holographic system, for example as shown in FIG. 1, light incident on the LCOS SLM is polarised in the necessary direction, so that the incident light is spatially modulated, according to a hologram encoded on the SLM, and output to form a holographic reconstruction.

Accordingly, in the above example, the property of light is polarisation. In this example, SLM 407 is arranged to output (i.e. reflect) incident light polarised in a first direction (corresponding to a first property state) without spatial modulation thereof, and to spatially modulate incident light polarised in a second direction (corresponding to a second property state), perpendicular to the first direction. In another example, the property of light is coherence. In this example, the SLM 407 is arranged to output (i.e. reflect) incident light that is incoherent (corresponding to the first property state) without spatial modulation thereof, and to spatially modulate incident light that is coherent (corresponding to the second property state). In yet another example, the property of light is wavelength (or frequency). In this example, the SLM 407 is arranged to output (i.e. reflect) incident light of wavelengths outside a particular wavelength band of one or more wavelengths (corresponding to the first property state) without spatial modulation thereof, and to spatially modulate incident light within the wavelength band (corresponding to the second property state). Further details of these examples are provided below.

In the arrangement of FIG. 4, a light tuning device 405 is arranged in the path of the incident light between the light source 401/collimating lens 403 and the SLM 407. Light tuning device 405 is arranged to change a property (or characteristic) of the light from the light source 401/collimating lens 403 so as to change the proportion of light having the second property state. Thus, when the light tuning device 405 receives light from the light source 401/collimating lens 403, the tuning device 405 may be adjusted or tuned so as to change the proportion of the light incident on SLM 407 having the second property state.

For example, the light tuning device 405 may be controlled by a controller (not shown in FIG. 4) to change the proportion of the light incident on SLM 407 that is polarised in the second direction, and thus spatially modulated by SLM 407. Thus, the light tuning device 405 is able to selectively change the proportion of incident light having the second property state (e.g. polarised in the necessary direction) for spatial modulation by the SLM 407, and thus for producing a holographic reconstruction. The remaining proportion of incident light having the first property state is reflected by the SLM 407 without modulation (also known as "zero order undiffracted light" as described above), and does not contribute to the holographic reconstruction. Thus, the light tuning device 405 adjusts the ratio of incident light having the first property state and light having the second property state (e.g. the ratio of the perpendicular polarisation components of the light). More specifically, the light tuning device 405 adjusts the ratio between the amount (e.g. intensity, optical energy, brightness etc) of light having the first property state and the amount (e.g. intensity, optical energy, brightness etc) of light having the second property state.

Illumination system has a first illumination mode, also referred to a fixed illumination mode, which is a "default" or "low beam" mode of the illumination system. In the first illumination mode, substantially all the incident light on the SLM 407 has the first property state and substantially none of the incident light has the second property state. Thus, substantially 100% of the incident light is output (e.g. reflected) by SLM 407 without spatial modulation whilst substantially 0% of the incident light is output by SLM 407 following spatial modulation, and the ratio of light having the first property state and light having the second property state is 1:0. The unmodulated/zero order undiffracted light is referred to herein as the "first component" of the output light from the SLM 407. As illustrated by the dashed lines in FIG. 4, the first component of the output light from SLM 407 is directed along a narrow (substantially collimated) path toward the centre of reflector 409. Reflector 409 directs the first component of the output light, which is shown as a relatively narrow area light beam 413 onto a scene (e.g. a road) 417. Alternatively, the reflector 409 may direct the first component onto additional optics when then relay light beam 413 onto the scene. This default or low beam formed in the first illumination mode comprises a fixed pattern of illumination (e.g. shape, size etc), and can take any suitable form. Thus, in the first illumination mode, the SLM 407 does not form a holographic reconstruction on the replay field, and the consequential demand on the holographic system to provide the default illumination is low.

In addition, the illumination system has a second illumination mode, also referred to as a variable illumination mode, which provides one or more holographic reconstructions that contribute to the illumination of the scene, for example by supplementing, such as shaping or modifying, the pattern formed by the default light beam 413 of the first illumination mode. In the second illumination mode, light tuning device 405 is adjusted to selectively provide a proportion of incident light having the second property state, which is spatially modulated by the SLM 407 according to a selected hologram. This spatially modulated light is referred to as the "second component" of the output light from the SLM 407. Thus, in the second illumination mode, a selected proportion of the incident light on the SLM 407 has the second property state, and is output spatially modulated according to a hologram as the second component, whilst a remaining proportion of the incident light on the SLM 407 has the first property state, and is output by SLM 407 without spatial modulation as the first component. Thus, the light tuning device 405 provides a selected ratio between light having the first property state and light having the second property state. As shown in FIG. 4, as in the first illumination mode shown by dashed lines, the first component of the output light from SLM 407 is directed along a first path onto the scene 417. In addition, in the second illumination mode illustrated by solid lines in FIG. 4, the second component of the output light from SLM 407, comprising the holographic reconstruction, is directed along a second path, for example, along a wide, optionally diverging, path that spreads across the surface of reflector 409. Reflector 409 projects the corresponding holographic reconstruction in a desired manner to shape the beam of the output light, for example as a relatively wide area holographic light beam 415 onto the replay field/scene 417 as shown in FIG. 4.

Thus, in the second illumination mode, the SLM 407 forms a holographic reconstruction on the replay field based on a selected proportion of incident light. This holographic beam formed in the second illumination mode comprises a selected pattern of illumination (e.g. shape, size etc) based on the hologram, selected light proportions etc, which modifies the default pattern of illumination and can be changed dynamically over time (e.g. to provide a wider "high beam" as shown in FIG. 4). The demand on the holographic system is increased in comparison the default illumination provided in the first illumination mode. Nevertheless, only a proportion of the light from the light source 401/collimating lens 403 is spatially modulated. Furthermore, the holographic reconstruction may be limited to selected points on the replay field 417 (e.g. outside the area of the default light beam 413).

Thus, a more defined image and light beam can be formed in a more computationally efficient and less demanding manner.

Based on the foregoing, it may be said that the light tuning device 405 effectively operates to control the proportion of light that is spatially modulated according to a hologram and output by SLM 407 (i.e. corresponding to the second component), which is substantially 0% in the first illumination mode and is a selected percentage in the second illumination mode. This, in the illumination system of FIG. 4, the light tuning device 405 may be regarded as a control device operable to control the proportion of light output by SLM 407 that corresponds to the second component.

Control System

Figure 5:
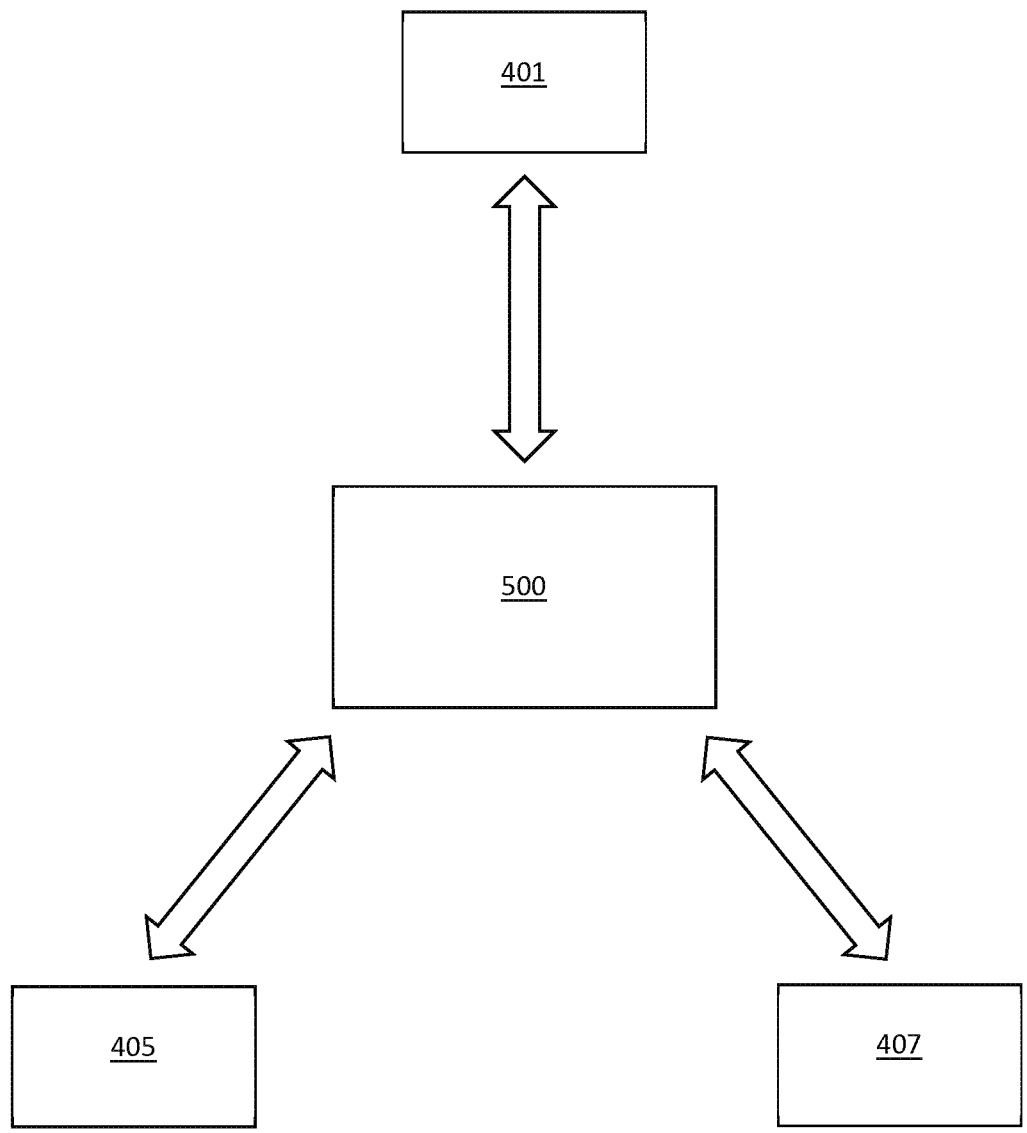
FIG. 5 is a schematic of a control system for the illumination system of FIG. 4

FIG. 5 shows a control system for controlling the illumination system of FIG. 4. Control system comprises a controller 500, arranged to control various elements or components of the illumination system of FIG. 4, in particular light source 401, light tuning device 405 and SLM 407. Controller 500 may comprise any suitable processing device arranged for communicating signals for controlling the elements of the illumination system. Controller 500 may provide signals to turn light source 405 on and off and control the intensity, optical energy or brightness of the light produced thereby. Controller 500 may provide signals to control the light tuning device 405 to provide a selected proportion of incident light having the second property state, as discussed above. Controller 500 may provide signals to change or adjust a hologram encoded on, or displayed by, the SLM 407. In some examples, an SLM control device (not shown) may be associated with the SLM 407, for example integrated therewith. In this case, the SLM control device receives signals from the controller 500 and directly controls SLM 407. In other examples, the controller 500 directly controls SLM 407. Controller 500 may be arranged to receive control inputs, for the selection of illumination properties, such as the illumination type, intensity level and the like, and, in the second illumination mode, for selection of the hologram and optionally other illumination properties, such as a proportion of incident light of the second property state etc. For example, controller 500 may receive control inputs from manually operated controls, such as switches, dials or the like. In addition or alternatively, controller 500 may receive control inputs from sensors, cameras, Advanced Driver Assistance Systems or the like that provide automatic control signals in response to detection or sensing of predefined conditions. Thus, controller 500 controls the elements of the illumination system based on one or more control inputs for selecting the illumination or light beam. Controller 500 may control one or more of the elements of the illumination system over time to provide the selected illumination or light beam.

Accordingly, in the second illumination mode, the default beam produced in the first illumination mode may be changed to introduce holographic content, in accordance with a selected hologram and/or light beam. The holographic content may be designed to modify the default light beam. For example, when the illumination system is implemented in a vehicle headlamp, the holographic content may modify the low-level beam to illuminate detected road signs, hazards, junctions and the like, or to switch to a high-level beam, for example a wider and/or increased intensity beam. The holographic content may provide the switchable "high-beam" of the vehicle headlamp. The shape of the "high-beam" light pattern may be dynamically changed or adapted in response to control inputs—e.g. detection of the position of an incoming vehicle. The holographic content may provide any kind of adaptive/automated high-beam modification that can be envisaged.

Light Tuning Device

As discussed above, the light tuning device 405 operates on the light from the light source 401/collimating lens 403, and, in particular, is arranged to provide a variable proportion of incident light of a second property state. It may be said that the selected proportion of the incident light is changed by the light tuning device 405 from a first property state to the second property state.

In a preferred example, the property of light is linear polarisation (referred to herein simply as "polarisation"), and the light tuning device 405 is a half-wave plate. In this example, the light from the light source is polarised in a first direction (e.g. horizontal or vertical direction). In the first illumination mode, the half-wave plate transmits the light from the light source substantially unchanged. In the second illumination mode, the half-wave plate may be rotated to change the relative phase of the two components of the light wave, to thereby introduce a component of light polarised in a second direction that is perpendicular to the first direction. In this example, the SLM 407 is only able to spatially modulate light polarised in the second direction, by virtue of the liquid crystal material of the pixels thereof, as explained above. Accordingly, the half-wave plate 405 may be adjusted or "tuned" to change the proportion of light incident on the SLM 407 that is polarised in the second direction. The resulting component of the light that is polarised in the second direction is spatially modulated by the SLM 407 and produces a holographic reconstruction, which is projected by projection optics 409 as the holographic light beam 417, as described above. A light tuning device 405 comprising a half-wave plate may equally be used in conjunction with a light source that provides light polarised in the second direction. In this arrangement, the tuning device 405 may be used to change 100% of the light, in the first illumination mode, so that substantially all the light incident on the SLM 407 is polarised in the first direction. The tuning device 405 may be adjusted from this position, in the second illumination mode, to reduce the proportion of light polarised in the first direction, to thereby introduce a component of light polarised in the second direction as described above.

Examples using a half-wave plate as the light tuning device 405 are currently preferred, since they provide a simple solution that makes use of the inherent sensitivity and response of some LCOS SLMs to light polarised in one particular direction such that tuning is possible using a half-wave plate. However, other examples are possible and contemplated.

In another example, the property of light is coherence, and the light tuning device 405 changes the incident light from coherent light to incoherent light (or vice versa). This example effectively makes use of the inherent sensitivity of the holographic system to coherent light as opposed to incoherent light. In particular, if an SLM is illuminated with coherent light, a holographic reconstruction can be formed from a hologram displayed or encoded on the SLM, whereas if the SLM is illuminated with incoherent light, a holographic reconstruction is not formed. Thus, holography requires a light source that produces sufficiently coherent light (i.e. light having a minimum coherence length, as discussed above), such as a laser or laser diode. When an SLM is illuminated with incoherent light, it effectively outputs light that is unmodulated (i.e. specularly reflected). It is possible for the light tuning device 405 to convert coherent light to incoherent light in a number of known ways. Thus, in a first illumination mode, substantially 100% of the coherent light may be converted to incoherent light, and, in the second illumination mode, a selected proportion of coherent light may be introduced to the light incident on the SLM 407. In order to change the relative proportions of coherent and incoherent light in the second illumination mode, and thus the ratio therebetween, one approach may implement illumination of the SLM 407 using time division. Thus, in this example, the tuning device 405 may be controlled over time to switch between coherent and incoherent light, and thus from the default low beam 413 produced at times when the SLM 407 is illuminated by incoherent light, and the holographic content of the holographic beam 417 produced from the spatially modulated light at times when the SLM 407 is illuminated by coherent light.

Table 1 shows one example of the time division illumination of SLM 407, comprising four successive time intervals of a time period (corresponding to sub-frames of a frame):

TABLE 1

| Image sub-frame | Mode | Light type |
| --- | --- | --- |
| 1 | First (Low/default beam) | Incoherent |
| 2 | First (Low/default beam) | Incoherent |
| 3 | Second (Holographic only) | Coherent |
| 4 | First (Low/default beam) | Incoherent |

Thus, in sub-frames 1, 2 and 4 of Table 1, the output light of the SLM corresponds to the first component, whilst in sub-frame 3 the output light of the SLM 407 is solely the holographic content corresponding to second component. When using time division illumination, the sub-frame rate, corresponding to the rate at which the tuning device switches between coherent and incoherent light, is preferably faster than the integration time of the eye. For example, the sub-frame rate may be about 500 Hz. Table 1 illustrates on example of implementing time division illumination to provide a particular selected proportion of coherent light, in this case 25% for the time period of four sub-frames, in a second illumination mode. The number of sub-frames for each time period, and the type of light provided for illuminating the SLM 407 in each sub-frame, may be varied in the second illumination mode to provide any other selected proportion of coherent light, as required.

In yet another example, the property of light is wavelength (or, conversely, frequency). In this example, the SLM is arranged to be responsive to light of a particular wavelength (or a plurality of wavelengths within a wavelength band), and therefore only modulates light of the particular wavelength, $\lambda_{SLM}$. A wavelength selective SLM may be implemented, for example, using a dichroic coating on the SLM, which is reflective to all wavelengths except the particular wavelength $\lambda_{SLM}$. In this way, only incident light of the particular wavelength $\lambda_{SLM}$ is spatially modulated by SLM, and light of all other wavelengths is reflected without modulation.

In this example, the light tuning device 405 may change the wavelength of the light provided by a light source. For example, the light source may produce light with a spectrum having a Gaussian profile centred around a wavelength $\lambda_C$, which is different from $\lambda_{SLM}$.

Thus, in a first illumination mode, the light tuning device 405 may transmit light from the light source substantially unchanged, for output (e.g. reflection) without modulation by SLM 405. In the second illumination mode, the light tuning device 405 may be arranged to tune the light from the light source, for example by shifting the centre of the Gaussian profile, to introduce a selected proportion of light of the particular wavelength $\lambda_{SLM}$. Thus, in the second illumination mode of this example, the selected proportion of light of the particular wavelength $\lambda_{SLM}$ is spatially modulated by the SLM 407 and produces a holographic reconstruction, which is projected by projection optics 409 as the holographic light beam 415, whilst the remaining proportion of light is output (e.g. reflected) without modulation, and projected by projection optics 409 as default low beam 413, as described above.

Illumination Method

Figure 6:
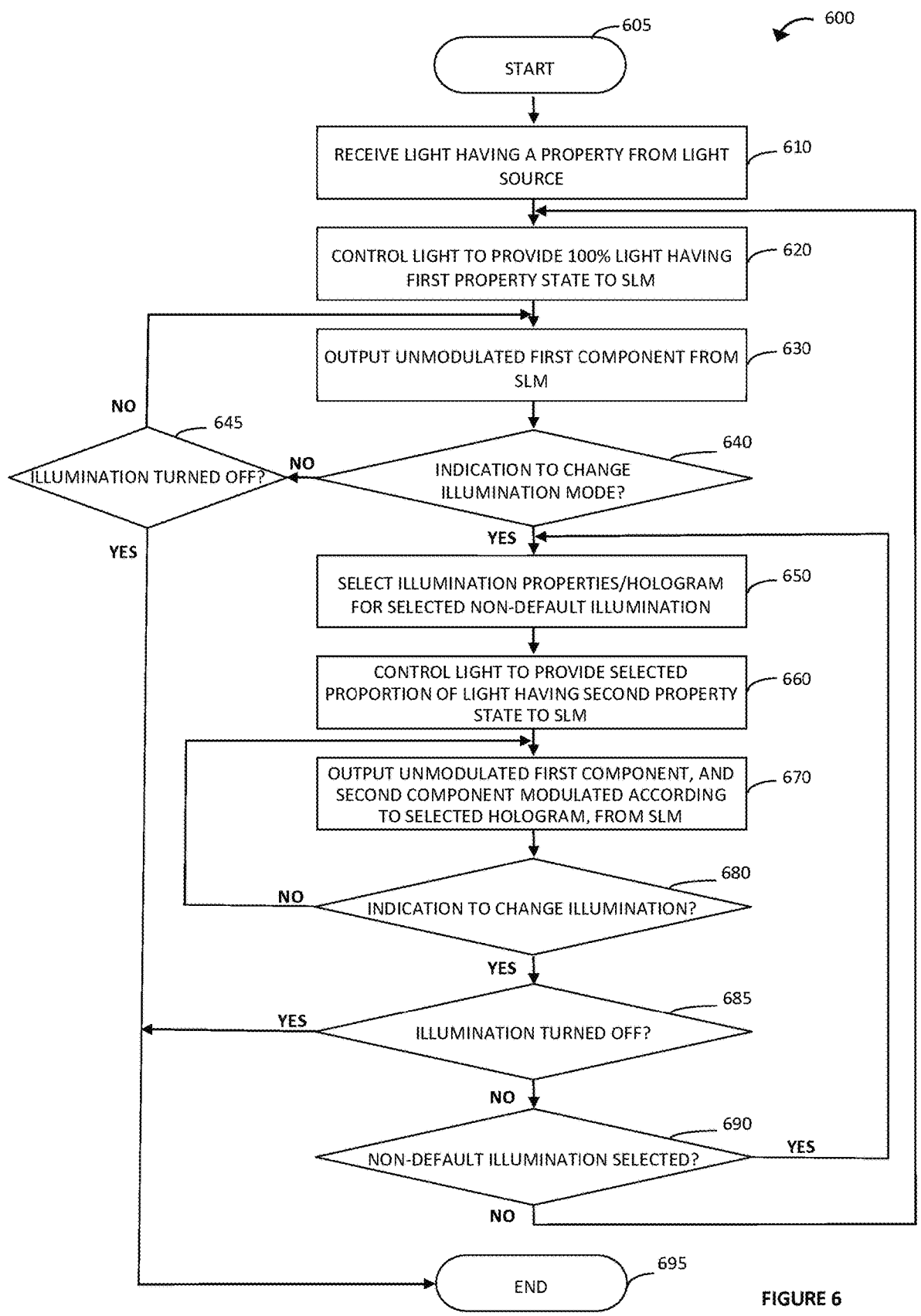
FIG. 6 is a flowchart of a method for operating an illumination system in accordance with the embodiments of FIG. 4.

FIG. 6 is a flowchart of a method 600 for providing light illumination in accordance with embodiments. In particular, the method 600 may be implemented by the controller 500 of FIG. 5, controlling a light source 401, light tuning device 405 and SLM 407 of the illumination system of FIG. 4.

The method 600 starts at step 605. At step 610, the controller turns on a light source so that the light tuning device of the illumination system receives light having a property from the light source. For example, in an illumination system according to FIG. 4, the tuning device is in the path of light between the light source and the SLM, and the light from the light source has the property of polarisation.

At step 620, the controller adjusts the tuning device. In particular, the tuning device is adjusted to control the received light to provide 100% light having a first property state to the SLM, and, conversely, 0% light having a second property state. For example, the tuning device may comprise a half-wave plate that controls the polarisation of the received light and transmits 100% light polarised in a first direction to the SLM.

At step 630, the SLM outputs the light received from the tuning device unmodulated (i.e. as zero order undiffracted light) as a first component of output light. In particular, the SLM does not spatially modulate light in the first property state. Thus, in the above example, the SLM receives light polarised in the first direction and outputs the received light unmodulated, as described above. The output light from the SLM is then projected, or otherwise optically processed, by the illumination system to form the desired illumination, such as in the form of a light beam.

Accordingly, in steps 620 and 630 of the method 600, the illumination system is operated in the above-described first illumination mode to form a default or low beam, without holographic content.

At step 640, the controller determines whether an indication to change the illumination mode—e.g. an indication to supplement the existing illumination—has been received. As described above, the controller may receive control inputs, which may select a non-default illumination or illumination type for a detected condition or user requirement etc. For example, a number of predetermined types of illumination that modify the default beam by introducing predefined holographic content may be preprogramed for selection (or calculated in real time) by corresponding control inputs. Accordingly, if step 640 determines that an indication to change the illumination mode is been received, step 650 selects the illumination properties and hologram for the selected illumination (e.g. corresponding preprogramed illumination properties and hologram). For example, the controller may select (or calculate) a corresponding hologram for the SLM, and may select an adjusted level for the tuning device, in accordance with the control inputs. The method then proceeds to step 660.

However, if step 640 determines that no indication to change the illumination mode is received, step 645 determines whether the illumination is to be turned off. For example, the controller may receive a control input to turn off the illumination system. If step 645 determines that the illumination is to be turned off, the controller turns off the light source and the method ends at step 695. Otherwise, the method returns to step 630, and the illumination system continues to operate in the first illumination mode and to provide the default beam.

At step 660, the light tuning device is adjusted. In particular, the tuning device is adjusted to control the received light to provide a selected proportion of light having a second property state to the SLM. For example, the tuning device may comprise a half-wave plate that controls the polarisation of the received light and transmits a defined proportion (e.g. percentage or component) of the light polarised in a second direction, perpendicular to the first direction, to the SLM in accordance with the selected illumination. The remaining proportion (e.g. percentage or component) of the light is polarised by the half-wave plate in the first direction.

At step 670, the SLM outputs the proportion of received light polarised in the first direction unmodulated (i.e. as zero order undiffracted/unmodulated light) as a first component of output light, and the proportion of received light polarised in the second direction modulated according to a selected hologram thereon (e.g. encoded thereon by the controller) as a second component of output light. In particular, the SLM spatially modulates light in the second property state, but, as indicated above, does not spatially modulate light in the first property state. Thus, in the above example, the SLM outputs the proportion of light polarised in the first direction without modulation, but spatially modulates and outputs the proportion of light polarised in the second direction to form a corresponding holographic reconstruction. The output light from the SLM is then projected, or otherwise optically processed, by the illumination system to form the desired illumination with the holographic content, as described above.

Accordingly, in steps 660 and 670 of the method 600, the illumination system is operated in the above-described second illumination mode to form a holographic beam, which modifies the default or low beam using holographic content for the selected illumination.

At step 680, the controller determines whether an indication to change the illumination has been received. For example, the controller may receive control inputs that change the type of illumination, the illumination mode or switch off the illumination entirely. If step 680 determines that no indication to change the illumination is received, the method returns to step 670 and the illumination system continues to operate in the second illumination mode and to provide the currently selected holographic beam.

However, if step 680 determines that an indication to change the illumination is received, step 685 determines whether the illumination is to be turned off. For example, the controller may receive a control input to turn off the illumination system entirely. If step 685 determines that the illumination is to be turned off, the controller turns off the light source and the method ends at step 695. Otherwise, the method proceeds to step 690.

At step 690, the controller determines whether another non-default illumination is selected in the second illumination mode. For example, the controller may receive control inputs to change the selected illumination, and thus select different illumination properties and/or hologram from the current illumination properties and hologram. If step 690 determines that a different, non-default illumination is selected, the method returns to step 650 which selects the illumination properties and hologram for the newly selected illumination (e.g. corresponding preprogramed illumination properties and hologram). The method then continues in the second illumination mode (steps 660 and 670) to provide the newly selected holographic beam.

However, if step 690 determines that another non-default illumination is not selected, then the indication to change the illumination received at step 680 is to change to the first illumination mode or indicates a fault or error. Accordingly, the method returns to step 620, and reverts to the first illumination mode (step 620 and 630) to provide the default or low beam. In the case of an error or fault, reverting to the first illumination mode ensures that the illumination operates safely, as explained further below.

Accordingly, the method 600 of FIG. 6 provides simple and efficient control of the components of the illumination system of FIG. 4. Various modifications to the embodiment illustrated in FIG. 6 are possible and contemplated. For example, step 680, 685 and 690 may be performed in any suitable order. However, in accordance with embodiments, the method starts with, and defaults to, the first illumination mode, in which the default or low beam is provided without holographic content, with consequential advantages as described below.

The method 600 of FIG. 6 may be implemented using software, hardware, firmware or a combination thereof. For example, a computer readable medium may be configured with program instructions for a controller to carry out the method of FIG. 6.

Illumination System II

Figure 7:
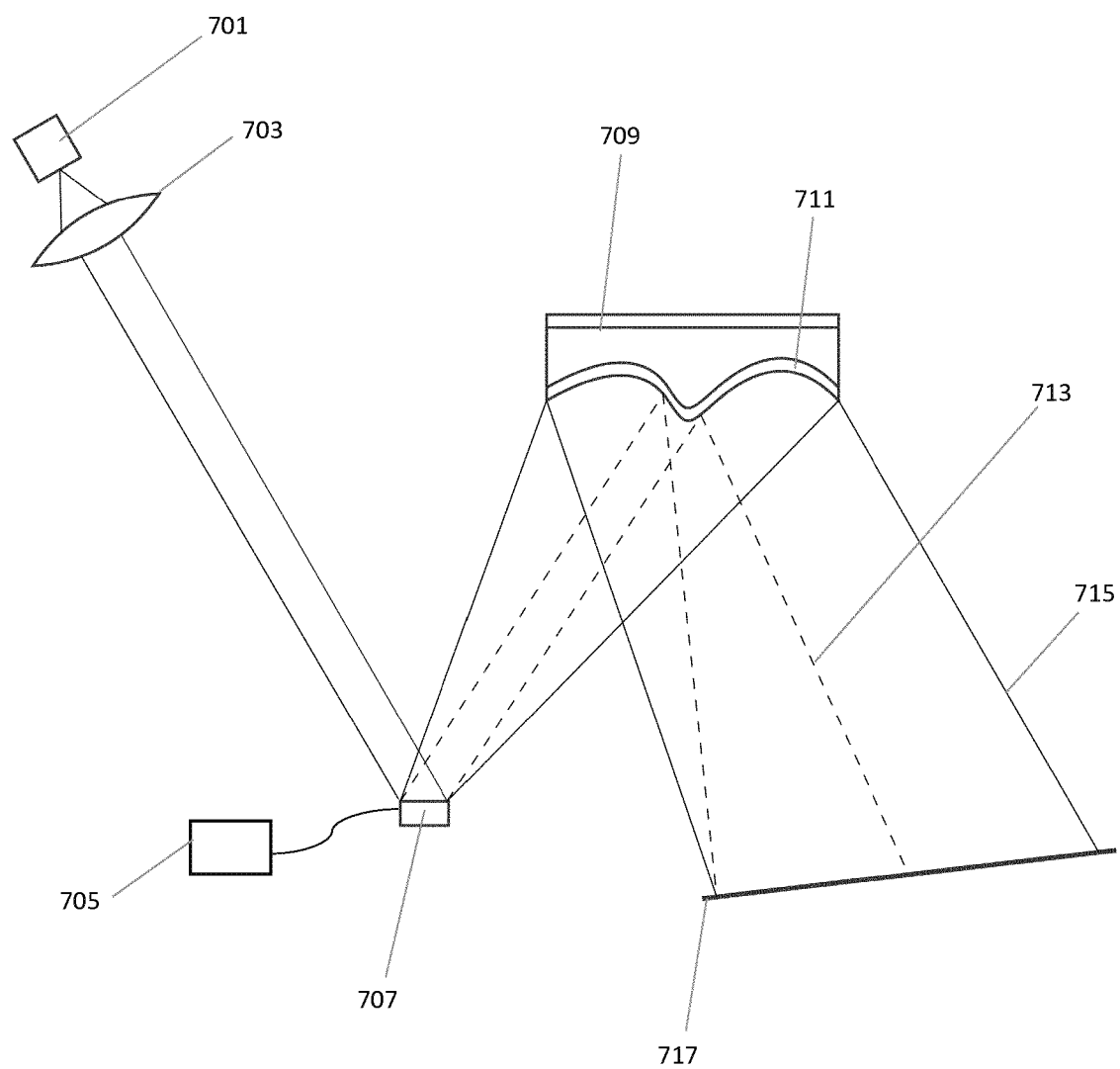
FIG. 7 shows an illumination system in accordance with other embodiments.

FIG. 7 shows an illumination system in accordance with alternative embodiments. The illumination system comprises an SLM-based system, which may be controlled to output light. The output light is projected by projection optics as a light beam for illuminating a scene.

In particular, the illumination system comprises a light source 701, for example a blue laser diode, arranged to illuminate an SLM 707. A collimating lens 707 is arranged so that a generally planar wavefront is formed as the incident light on the SLM 707. In the illustrated arrangement, SLM 707 is a reflective SLM and the direction of the wavefront of incident light is off-axis (e.g. two or three degrees away from orthogonal to the SLM). Thus, the incident light is reflected by a rear reflective surface of the SLM 707 to form an exit wavefront in a direction, which is likewise off-axis, towards projection optics 707. In other embodiments, SLM 707 may be a transmissive SLM, which transmits incident light instead of reflecting incident light. The projection optics comprise a shaped reflector 707, optionally having a phosphor coating 711, for forming a shaped light beam 713, 717 as described above with reference to FIG. 4. The phosphor coating 711 is used in conjunction with a blue light source 701, such as a blue laser diode, to convert blue light output from the SLM 707 into white light to form the light beam, as well known in the art. Other embodiments comprising on-axis arrangements and/or other arrangements for forming the shaped light beam are possible and contemplated, as described above with reference to the illumination system of FIG. 4.

The behaviour of the SLM 707 is controlled by SLM control device 705. Thus, in the alternative embodiments shown in FIG. 7, the light tuning device of the embodiments shown in FIG. 4 is omitted. Instead, the SLM control device 705 serves to control the proportion of the above described first and second components of output light by SLM 707, as explained further below.

In some embodiments, SLM control device 705 controls the SLM 707 by changing the hologram encoded thereon, so as to change the proportion of the incident light that is spatially-modulated by the SLM 707 and output as zero and higher order diffracted light to form a holographic reconstruction, and, conversely, the proportion of incident light that is output by the SLM 707 as zero order undiffracted light (i.e. the unmodulated light or DC spot in the replay field). Thus, by dynamically changing the hologram encoded on the SLM 707, it is possible to control the proportion of light corresponding to first and second components of output light by the SLM 707, as described above. In particular, the zero order undiffracted light corresponds to the first component of output light by the SLM 707, and the light that is spatially modulated according to a hologram and output by the SLM 707 for forming a holographic reconstruction corresponds to the second component.

The hologram encoded on an SLM may be changed, to alter the proportion of incident light that is spatially-modulated according to the hologram by the SLM 707, using a variety of possible techniques.

One technique suitable for a phase-only LCOS SLM is to change the allowable phase values. In particular, as described above with reference to FIGS. 2A to 2C, a hologram computed using a Fourier transform comprises a 2D array of complex numbers, and, in the case of phase-only holography, each complex number is converted into an allowable modulation level (called grey level) by setting the amplitude component to unity and quantising the phase value in accordance with one of the grey levels, which may be represented on the pixels of the spatial light modulator (as in processing block 253 of FIG. 2A).

Figure 8A:
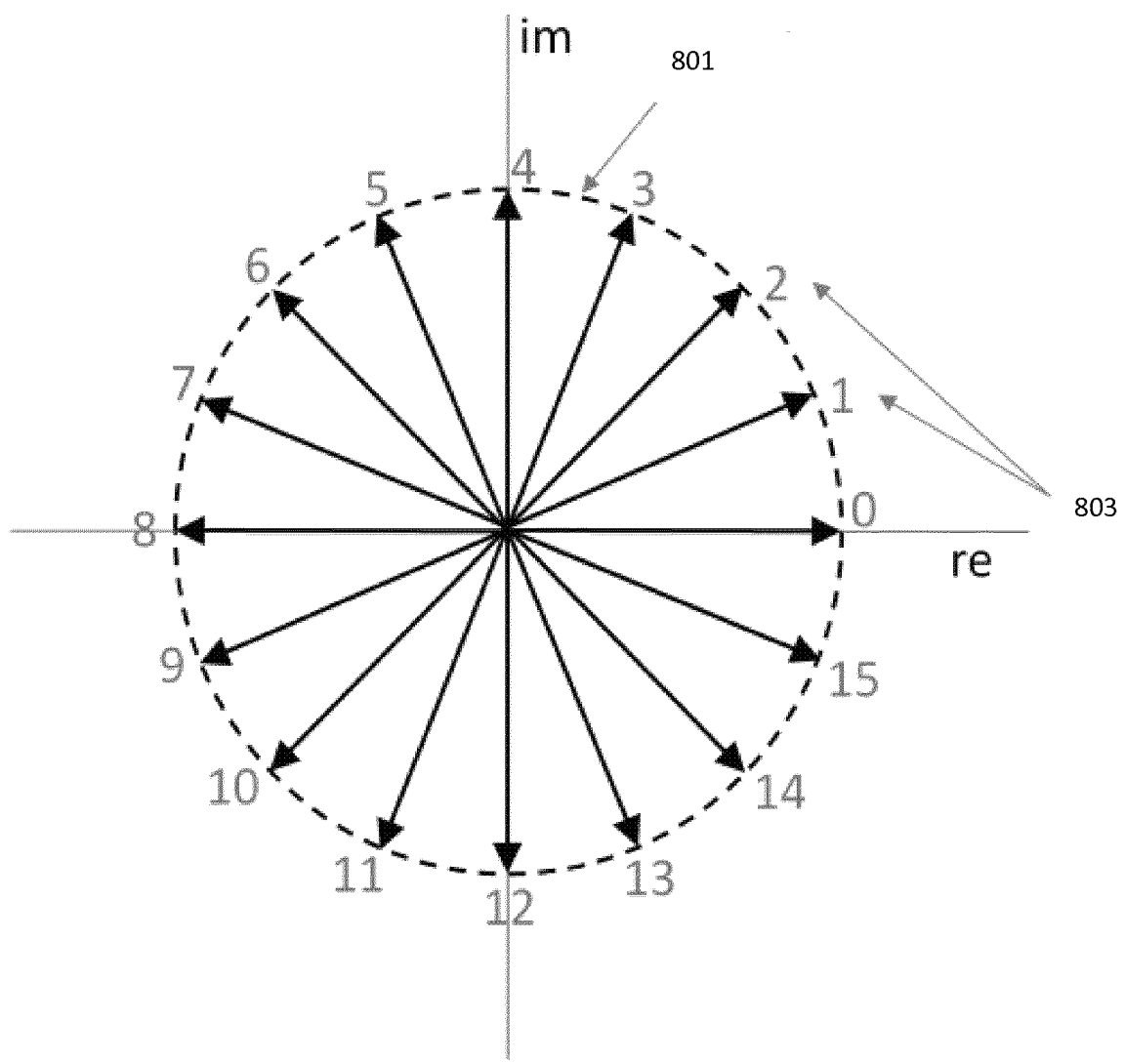
FIG. 8A illustrates an evenly distributed set of allowable phase/modulation levels plotted over a range 0 to $2\pi$ in the complex plane.
Figure 8B:
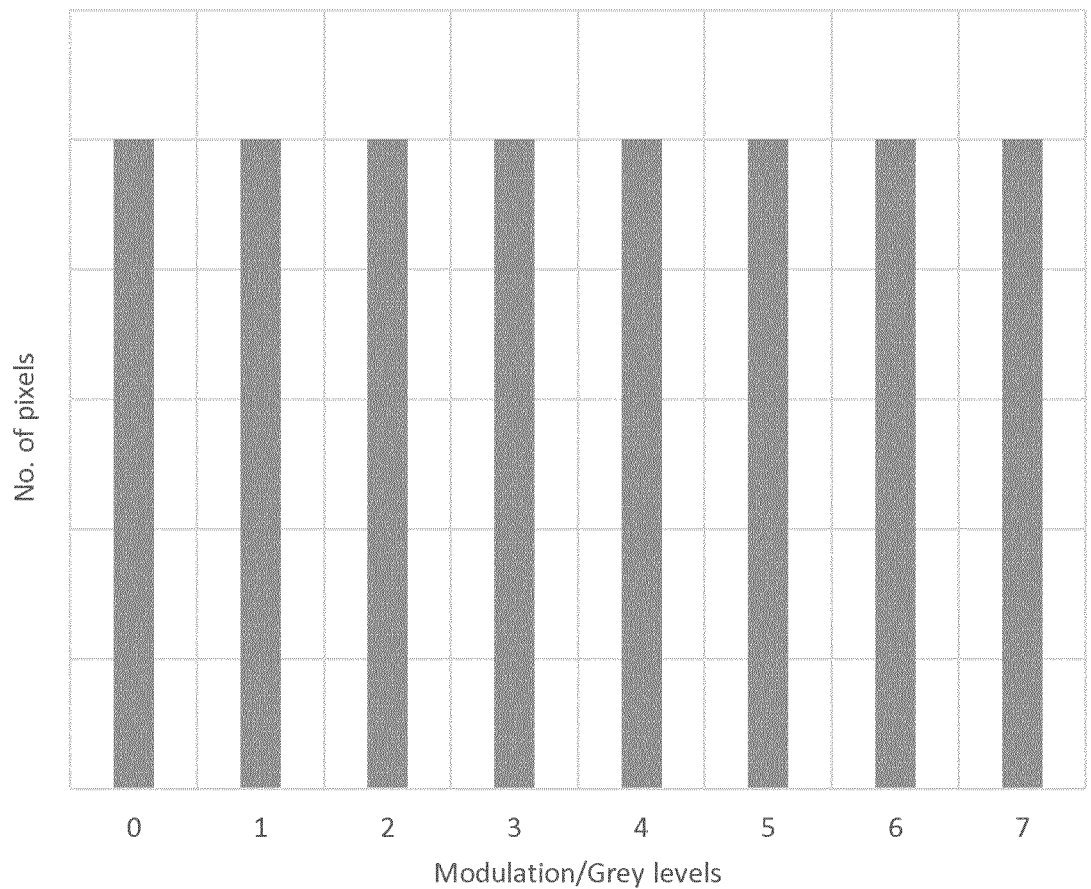
FIG. 8B illustrates the allowable phase/modulation levels of a balanced hologram.

The allowable modulation levels may be represented as vectors as a plot on the complex plane. The step of "quantising" may also be referred to as "constraining" because the calculated values are effectively constrained to allowable values. In the case of phase-only holography, the plurality of allowable modulation levels is a plurality of allowable phase values (having unity amplitude) on a circle in the complex plane. FIG. 8A shows an example with 16 allowable modulation levels 803 (labelled 0 to 15), represented as vectors on a unity amplitude phase circle 801 in the complex plane, and FIG. 8B shows an example with 8 allowable modulation levels (i.e. grey levels) in a "balanced" hologram, as described further below. Although in principle the quantisation points may be randomly distributed around the unity amplitude phase circle of FIG. 8A, it is found that the best quality holographic images are obtained when the quantisation points are evenly distributed.

Accordingly, in the example of FIG. 8A, in the quantisation step, each calculated complex number of the array of complex numbers of a computed hologram is allocated to one of the allowable modulation levels 0 to 15. For example, any mathematical approach—such as using a bank of comparators—may be used to identify the allowable modulation level which is closest to the calculated complex value in the complex plane.

Conventionally, for good quality holographic images in phase-only holography, a full $2\pi$ of allowable phase values is used as the range of allowable phase values. That is, the allowable phase value (e.g. 0 to 15 in FIG. 8A) should span $2\pi$ in the complex plane. This approach minimises the zero order undiffracted/unmodulated light, which represents undesirable "optical noise" in the holographic images, as discussed above. In contrast, embodiments of the illumination system shown in FIG. 7 may reduce or "truncate" the range of allowable phase values in an "unbalanced" manner, as described further below, in order to increase the zero order undiffracted/unmodulated light, which is utilised to actively contribute to the illumination provided by the illumination system.

In particular, the SLM control device 705 may dynamically compute the hologram (or change a pre-computed hologram) encoded on the SLM 707, so as to change the distribution and/or range of allowable phase values. This may be achieved in various ways. For example, during real time hologram calculation, SLM control device 705 may dynamically change the range of allowable modulation levels in order to dynamically change (decrease or increase) the proportion of output light from SLM 707 corresponding the zero order undiffracted/unmodulated light (first component) and, thus, the proportion of output light from SLM 707 forming the holographic reconstruction (second component). In another example, SLM control device 705 weights the hologram values using a weighting or scaling factor after calculation of the hologram. In particular, SLM control device 705 may multiply each of the quantised phase values by a scaling factor to reduce the range of allowable phase values (e.g. multiplying each of the quantised phase values by ½ will reduce the range from 0 to 2π to 0 to π). In another example, SLM control device changes the mapping of allowable modulation levels (i.e. grey levels) to voltage for the pixels of the SLM 707. In particular, a look-up table (LUT) may be used to correlate each grey level to an analogue voltage (if the device has an analogue backplane) or a so-called bit-plane sequence (if the SLM has a digital backplane). The values in the LUT may be manipulated to provide a reduced range of phases. In another example, SLM control device 705 changes the distribution of phase values within the range 0 to 2π (or a more limited range) to provide an uneven distribution. For example, the spacing between allowable modulation levels (e.g. phase values) may be dependent upon the modulation level (e.g. phase). In another example, each of the allowable modulation levels may be limited by a bin size, which may be dependent upon the modulation level. These and further examples are described in more detail below.

The allowable modulation levels 803 shown in FIG. 8A are evenly distributed around the origin of the phase circle. There is no net effect of all the vectors represented in FIG. 8A when added together. In this arrangement, it may be said that the modulation scheme is "balanced". Accordingly, references herein to: "a balanced hologram", "a balanced modulation scheme" and "a balanced system" mean that the sum of the vectors representing the allowable modulation levels for the hologram, modulation scheme or holographic system is zero. Conversely, references to: "an unbalanced hologram", "an unbalanced modulation scheme" and "an unbalanced system" mean that the corresponding vector sum is non-zero.

It is found that the Gerchberg-Saxton algorithm inherently balances use of the modulation levels of the hologram. That is, the grey levels are equally used, as shown in FIG. 8B. When the modulation scheme and hologram are balanced, the system is said to be balanced. That is, if the complex value of each hologram pixel were represented by a vector in the complex plane, the sum of all the vectors would be zero. Accordingly, in a balanced system implementing a balanced modulation scheme as illustrated by FIG. 8A and the Gerchberg-Saxton algorithm for hologram calculation as illustrated by FIG. 8B, the intensity of the zero order unmodulated light (i.e. DC spot) is minimised.

Figure 9:
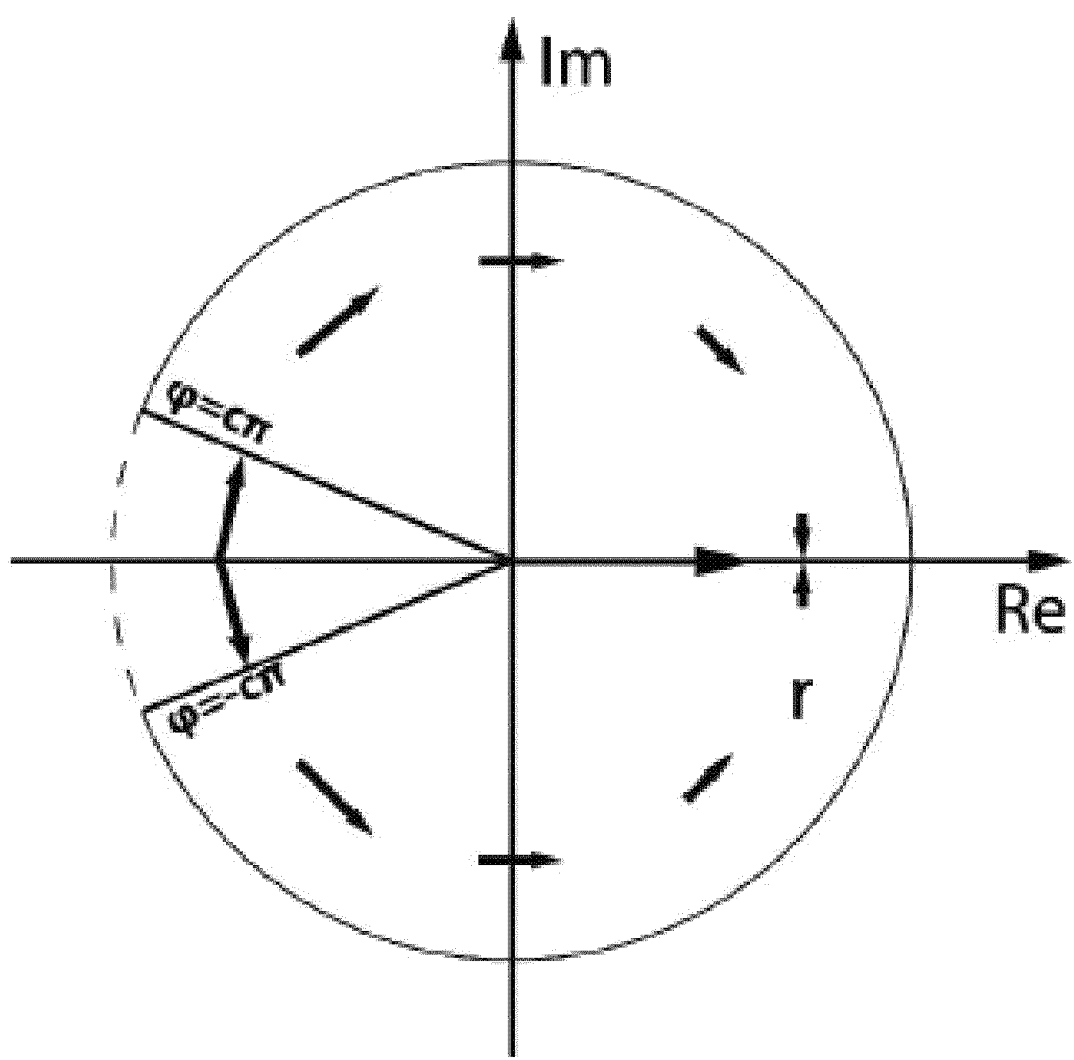
FIG. 9 illustrates a sum vector of the all available modulation levels of an allowable set of phase modulation levels.

Accordingly, by dynamically changing the hologram encoded on a phase-only LCOS SLM to have different distributions of allowable phase values, it is possible to "unbalance" the system in order to change (increase/decrease) the intensity of the zero order unmodulated light (i.e. the above first component or DC spot). In particular, the intensity of the unmodulated light can be increased by changing from a balanced system, in which the vector sum of the hologram pixels is zero, to an unbalanced system, in which the vector sum of the hologram pixel values is non-zero and so represents the DC spot, as shown in FIG. 9.

Unbalancing the system could be achieved in the number of ways, for example by unbalancing the modulation scheme and/or by unbalancing the hologram.

Unbalanced Truncation of the Phase Circle

In some embodiments implementing a phase-only LCOS SLM, unbalanced "truncation" of the phase circle for the allowable modulation levels could be used. As described above, conventionally in phase-only holography, a full 2π of allowable phase values are required to achieve good quality holographic images. That is, the allowable phase values (e.g. the grey levels 0 to 15 in FIG. 8A) should span 2π in the complex plane. If the range of allowable phase values is decreased from 2π, the phase circle is said to be "truncated". If the hologram pixel values still sum to zero in the complex plane, it may be said that we have "balanced truncation". An example of balanced truncation is shown in FIG. 10A. The arcs of the phase circle indicated by solid lines in FIG. 10A represent regions used for the allowable phase values, and the arcs indicated by dotted lines are the truncated regions where phase values are not allowed. When the truncation is balanced, each and every allowable modulation level on the phase circle has an equal and opposite point on the diametrically opposite side of the phase circle, as shown for example by the pair of points marked "X" in FIG. 10A. In particular, the pair of points marked X in FIG. 10A have equal and opposite real and imaginary components. However, when the truncation is balanced, as in FIG. 10A, the zero order undiffracted/unmodulated light is minimised in the same way as the conventional 2π range of allowable phase values because the sum vector is still zero.

Accordingly, "unbalanced" truncation is required to generate a non-zero sum vector. An example of unbalanced truncation is shown in FIG. 10B. It can be seen that some modulation levels on the phase circle (e.g. at the point marked "X" on the solid arc), do not have an equal and opposite modulation level on the other side of the phase circle (since the point diametrically opposite to point X on the phase circle falls within the dotted arc). Thus, with an unbalanced distribution of allowable phase values as illustrated in FIG. 10B, the sum vector is non-zero and the intensity of the zero order undiffracted/unmodulated light (i.e. DC spot) is increased.

By dynamically changing the unbalanced truncation, it is possible to dynamically change the intensity of the zero order undiffracted/unmodulated light. In particular, returning to FIG. 7, the SLM control device 705 may dynamically compute the hologram in real time (or change a pre-computed hologram) encoded on the SLM 707, so as to provide an unbalanced distribution or range of allowable phase values (i.e. grey levels) in real time. The extent to which the grey levels are unbalanced, in turn, determines the proportion of the zero order undiffracted/unmodulated light (i.e. DC spot).

Unbalanced truncation may be achieved in various ways, as described below, which, either manipulate the hologram data after or during calculation thereof, or unbalance the modulation scheme (change the distribution of allowable phase values), by voltage conversion or otherwise. Combinations of the examples are also possible and contemplated by the present disclosure.

(i) Manipulate Hologram Data 1—Reassign Some Hologram Values After Calculation

In this example, hologram values are reassigned to unbalance the system. Specifically, hologram values on the phase circle which are excluded by the unbalanced truncation, should be reassigned—e.g. to the nearest allowable modulation level—in order to provide the unbalancing.

(ii) Manipulate Hologram Data 2—Scale the Hologram Values After Calculation

In this example, each of the quantised modulation levels (e.g. phase values) is multiplied by a scaling factor to reduce the range. Thus, for example, if P is the phase value and s is the scaling factor, the quantised modulation levels may be calculated using the equation: P·s. Thus, for example, multiplying each of the quantised phase values by ½ will reduce the range from 0→2π to 0→π, whilst multiplying by ⅚ will reduce the range from 0→360° to 0→300°. The value of the multiplier conveniently changes the amount of truncation and therefore provides means for computationally increasing or decreasing the zero order undiffracted/unmodulated light. The excluded region starts at the positive x-axis and rotates anti-clockwise around the phase circle. The length of the exclusion region is determined by the value of the multiplier. A variation of this method, shown in FIG. 10C, may introduce a non-zero offset d, which defines a phase offset from 0° (in degrees). In this case, the above equation becomes the more general equation: (P·s)+d.

This is a mathematically simple approach, which is straightforward to implement, and so is presently preferred.

(iii) Manipulate Hologram Data 3—During Hologram Calculation

In this example, during hologram calculation (which may be in real time) a distribution of allowable modulation levels used in the constraining step of the algorithm, as described above, is used to unbalance the system. For instance, the range of modulation values (e.g. phase values) may be dynamically truncated or expanded in order to dynamically decrease or increase the zero order undiffracted/unmodulated light and thus the intensity of the DC spot. Alternatively, an uneven distribution of allowable modulation levels may be used in the constraining step. For instance, the spacing between adjacent allowable modulation levels may increase with increasing modulation value, which corresponds to increasing the bin size for each allowable modulation level with increasing modulation value. For the avoidance of any doubt, a bin is the range of modulation values around an allowable modulation level. A modulation value in a particular bin is assigned the unique allowable modulation level of that bin. Thus, in this example, the separation of allowable modulation levels (i.e. size of the bins) increases with increasing modulation value so that that are more allowable modulation levels at lower values (e.g. phases) that higher values. In consequence, for a particular hologram calculation, more modulation values (e.g. grey levels) will be assigned to lower values (e.g. phases) than higher values, thereby unbalancing the system and changing the intensity of the DC spot.

(iv) Voltage Conversion 1—Changing the Mapping of Grey Levels to Voltage

In this example, a look-up table (LUT) is used to correlate each modulation value (i.e. "grey level") to an analogue voltage (if the device has an analogue backplane) or a so-called bit-plane sequence (if the SLM has a digital backplane). Thus, in a phase-only scheme, the values in the LUT are manipulated to provide a reduced range of allowable phase values. This approach is advantageous because it does not involve any changes to the hologram engine or operations to large arrays of data in computer memory. Table 2 below shows an example LUT used to convert the calculated grey levels into a cell voltage in a balanced arrangement. The system can be unbalanced by changing the mapping of grey level to voltage. Table 3 shows a modified LUT used to unbalance the system. Thus, in the balanced system of Table 1 the grey level 1 is 6V, whereas in the unbalanced system of Table 2 the grey level 1 instead uses 5V. This method is equivalent to moving the grey levels around the phase circle so that they are no longer evenly distributed (i.e. evenly spaced). Thus, each grey level does not have an equivalent opposite point, in contrast to the even distribution shown in FIG. 8A and described above.

TABLE 2

| Grey Level | Voltage | Phase/rads |
| --- | --- | --- |
| 0 | 7 | 0 |
| 1 | 6 | 0.8 |
| 2 | 5 | 1.6 |
| 3 | 4 | 2.4 |
| 4 | 3 | 3.2 |
| 5 | 2 | 4.0 |
| 6 | 1 | 4.8 |
| 7 | 0 | 5.6 |

TABLE 3

| Grey Level | Voltage | Phase/rads |
| --- | --- | --- |
| 0 | 7 | 0 |
| 1 | 5 | 1.6 |
| 2 | 3 | 3.2 |
| 3 | 1 | 4.8 |
| 4 | 0.75 | 5.0 |
| 5 | 0.5 | 5.2 |
| 6 | 0.25 | 5.4 |
| 7 | 0 | 5.6 |

(v) Voltage Conversion 2—Truncating the Mapping of Grey Levels to Voltage

In this example, a LUT is used as in the previous example. However, in this example, the required voltages are scaled to unbalance the system. Table 4 shows how the values of the LUT of Table 2 are scaled using this method.

TABLE 4

| Grey Level | Voltage | Phase/rads |
| --- | --- | --- |
| 0 | 3.5 | 2.8 |
| 1 | 3.0 | 3.2 |
| 2 | 2.5 | 3.6 |
| 3 | 2.0 | 4.0 |
| 4 | 1.5 | 4.4 |
| 5 | 1 | 4.8 |
| 6 | 0.5 | 5.2 |
| 7 | 0 | 5.6 |

Illumination Method II

Figure 11:
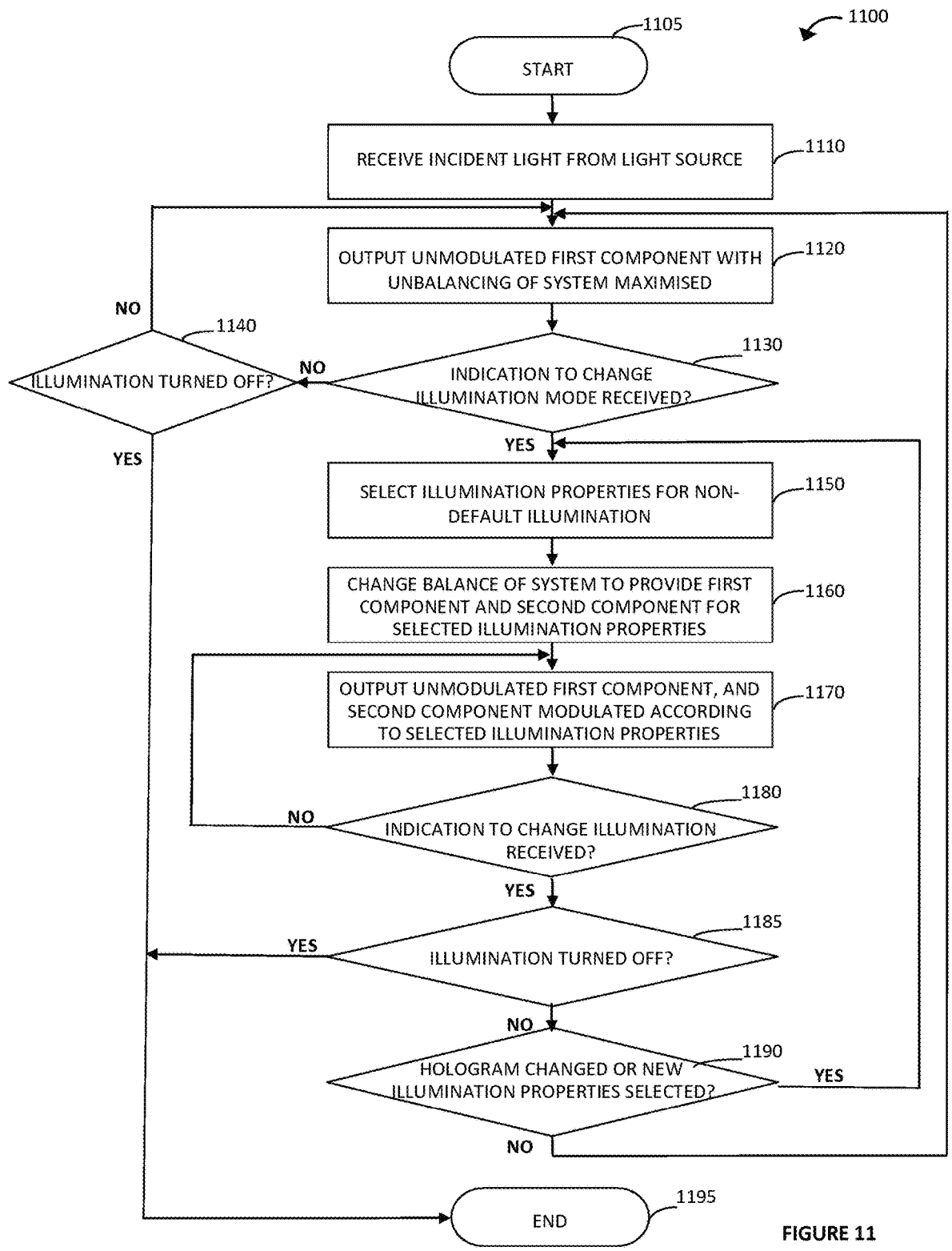
FIG. 11 is a flowchart of a method of operating an illumination system in accordance with the embodiments of FIG. 7.

FIG. 11 is a flowchart of a method 1100 for providing light illumination in accordance with the above described alternative embodiments. In particular, the method 1100 may be implemented by the controller 500 of FIG. 5, controlling the light source 701 and SLM control device 705 of SLM 707 of the illumination system of FIG. 7.

The method 1100 starts at step 1105. At step 1110, the controller turns on a light source and the SLM receives incident light from the light source.

At step 1120, the SLM outputs the received incident unmodulated (i.e. as zero order undiffracted light) as a first component of output light. In particular, the SLM is encoded with a hologram, whereby "unbalancing" of the system is maximised, so as to maximise the zero order undiffracted/unmodulated light output by the SLM as described above. The output light from the SLM is then projected, or otherwise optically processed, by the illumination system to form the desired illumination, such as in the form of a light beam.

Accordingly, in step 1120 of the method 1100, the illumination system is operated in the above-described first illumination mode, in which a default hologram is used to form a default or low beam, without (significant) holographic content.

At step 1130, the controller determines whether an indication to change the illumination mode—e.g. an indication to supplement the existing illumination—has been received. As described above, the controller may receive control inputs, which may select a non-default illumination or illumination type for a detected condition or user requirement etc. For example, a number of predetermined types of illumination that modify the default beam by introducing predefined holographic content may be preprogramed for selection by corresponding control inputs. Accordingly, if step 1130 determines that an indication to change the illumination mode is been received, step 1150 selects the illumination properties and hologram for the selected illumination (e.g. corresponding preprogramed illumination properties and hologram or calculated in real time). For example, the controller may select a corresponding hologram for the selected degree of balance for the system, in accordance with the control inputs. The method then proceeds to step 1160.

However, if step 1130 determines that no indication to change the illumination mode is received, step 1140 determines whether the illumination is to be turned off. For example, the controller may receive a control input to turn off the illumination system. If step 1140 determines that the illumination is to be turned off, the controller turns off the light source and the method ends at step 1195. Otherwise, the method returns to step 1120, and the illumination system continues to operate in the first illumination mode and to provide the default beam.

At step 1160, the SLM control device dynamically changes the hologram encoded on the SLM to change the balance of the system. In particular, the SLM control device changes the hologram to reduce the unbalancing the system (or, conversely, increase the balance thereof), and thus introduce more of the second component of output light forming holographic content. For example, the control device changes the proportion of the first and second components of output light by the SLM according to the selected illumination properties, by dynamically changing the hologram (e.g. changing the holographic data and/or modulation scheme) as described above.

At step 1170, the SLM outputs a proportion of unmodulated or zero order undiffracted light as a first component of output light, and the remaining proportion modulated according to the selected hologram thereon (e.g. encoded thereon by the controller) as a second component of output light. The output light from the SLM is then projected, or otherwise optically processed, by the illumination system to form the desired illumination with the holographic content, as described above.

Accordingly, in steps 1160 and 1170 of the method 1110, the illumination system is operated in the above-described second illumination mode to form a holographic beam, which modifies the default or low beam using holographic content for the selected illumination.

At step 1180, the controller determines whether an indication to change the illumination has been received. For example, the controller may receive control inputs that change the type of illumination, the illumination mode or switch off the illumination entirely. If step 1180 determines that no indication to change the illumination is received, the method returns to step 1170 and the illumination system continues to operate in the second illumination mode and to provide the currently selected holographic beam.

However, if step 1180 determines that an indication to change the illumination is received, step 1185 determines whether the illumination is to be turned off. For example, the controller may receive a control input to turn off the illumination system entirely. If step 1185 determines that the illumination is to be turned off, the controller turns off the light source and the method ends at step 1195. Otherwise, the method proceeds to step 1190.

At step 1190, the controller determines whether another non-default illumination is selected in the second illumination mode. For example, the controller may receive control inputs to change the selected illumination, and thus select different illumination properties and/or hologram from the current illumination properties and hologram. If step 1190 determines that a different, non-default illumination is selected, the method returns to step 1150 which selects the illumination properties and hologram for the newly selected illumination. The method then continues in the second illumination mode (steps 1160 and 1170) to provide the newly selected holographic beam.

However, if step 1190 determines that another non-default illumination is not selected, then the indication to change the illumination received at step 1180 is to change to the first illumination mode or indicates a fault or error. Accordingly, the method returns to step 1120, and reverts to the first illumination mode to provide the default or low beam. In the case of an error or fault, reverting to the first illumination mode ensures that the illumination operates safely, as explained further below.

Advantages

The above described embodiments may be regarded as implementing a hybrid system comprising a conventional low beam lighting system, which is used exclusively in the first illumination mode to provide the default beam, and a switchable holographic functionality, which is introduced in the second illumination mode to control (e.g. change) the light beam, as desired. This leads to a number of advantages over known illumination systems and methods.

For example, as discussed above, the holographic reconstruction, provided by the spatially modulated second component of light output by the spatial light modulator in the second illumination mode, is restricted to a limited area of the replay field. Thus, the hologram is computationally more feasible and provides good image quality, enabling well-defined shapes to be formed. In addition, the hybrid system conserves processing and power resources when providing "low beam" illumination.

As discussed above, conventional wisdom in the field of holography, in which the zero order unmodulated light spot (i.e. DC spot) from an SLM is perceived as a problem, the disclosed illumination system advantageously utilises, and may indeed enhance, the unmodulated light spot as the default or low beam.

Furthermore, in contrast to solely holographic illumination arrangements, should the holographic engine of the disclosed hybrid system fail, the low beam is still provided, and the illumination system is inherently fail to safe. In particular, in the event of errors in, or complete failure of, the holographic engine, the illumination system simply reverts to the first illumination mode and directs all the light into the safe "low beam". In contrast, if the hologram engine of the prior headlamp of GB2499579 fails, the driver is left either with no headlamps or, worse, a dangerous situation, in which the light beam may be directed by the malfunctioning hologram in ways not intended—e.g. into the eyes on an on-coming driver.

Nevertheless, the hybrid illumination system enables the use of holographic content to dynamically change (e.g. steer) the light distribution of the holographic light beam with changing conditions. It is also possible to dynamically vary other aspects of the light beam, such as colour and shape, both manually or automatically.

Moreover, the illumination system may be controlled, for example using the controller shown in FIG. 5, to allow the holographic content to be completely switched off (e.g. by manual selection of the first illumination mode). This may be desirable in certain geographical regions or jurisdictions to meet local requirements.

Additional Features

Various modifications and changes can be made to the illumination system and method of the embodiments described herein. For example, the intensity of the "low beam" in the first illumination mode could be enhanced by using additional light sources. Thus, in the example that makes use of the response of an SLM to polarised light, an additional polarised light source could be used to provide polarised light in the first direction (which is not spatially modulated by the SLM). Such an additional light source may be particularly beneficial in the second illumination mode, to supplement the detuned light source providing the hologram power and thus maintain the intensity of the default "low beam".

Regions of the replay field could be used for different illumination functions, under the control of the controller. For example, an illumination function could be selected in which a small proportion of the replay field is redirected using optics to provide a junction light—that is, a light at right angles, which illuminates down a junction as the vehicle turns. For example, this illumination function may be provided by at least part of the holographic content of the holographic light beam in the second illumination mode.

In the described embodiments of the illumination system, the SLM comprises a reflective SLM that may be used in place of a conventional mirror, in the conventional optics of an illumination system for a particular application (e.g. vehicle headlamp). In other implementations, a transmissive SLM may be used together with appropriate optical components for forming (e.g. projecting) the light beam. Thus, whilst embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, a vehicle headlamp comprising the disclosed illumination system is provided, and a vehicle in which one or more such headlamps are installed. The vehicle may be an automotive vehicle such as a car, truck, van, lorry, motorcycle, train, airplane, boat, or ship. The illumination system may be used in any other suitable lighting application that could benefit from a dynamically variable and controllable light beam, including, for example, spotlights and street lighting.

In embodiments, in the second illumination mode, the holographic reconstruction is created within the zeroth diffraction order of the overall window defined by the spatial light modulator, in accordance with conventional holographic techniques. It is preferred that the first and subsequent orders are displaced far enough so as not to overlap with the image and so that they may be blocked using a spatial filter.

Examples describe illuminating the SLM with visible light but the skilled person will understand that the light sources and SLM may equally be used to provide infrared or ultraviolet illumination, for example, as disclosed herein. For example, infrared spotlights may find application in night time searching applications, wherein visible light illumination is not practical. The skilled person will be aware of techniques for converting infrared and ultraviolet light into visible light for the purpose of providing the information to a user (e.g. thermal imaging cameras or viewing instruments). For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The Following Items are Disclosed:

Item 1. An illumination system arranged to output a light beam for illuminating a scene, comprising: a spatial light modulator arranged to receive incident light, and to output light comprising a first component and a second component, wherein the first component comprises incident light that is output without modulation by the spatial light modulator, and the second component comprises incident light that is spatially-modulated according to a hologram and output by the spatial light modulator; and a control device operable to control the proportion of light output by the spatial light modulator that corresponds to the second component.

Item 2. The system of item 1, wherein the control device comprises a light tuning device in the path of the incident light, and is arranged to adjust a property of the incident light.

Item 3. The system of item 2, wherein: the spatial light modulator is arranged to output incident light having a first property state without modulation as the first component and spatially-modulate incident light having a second property state according to a hologram and output the spatially modulated light as the second component, wherein the second property state is different from the first property state; and the light tuning device is operable to control the proportion of incident light having the second property state.

Item 4. The system of item 3 wherein the light tuning device is arranged to adjust a ratio of the incident light having the first property state and the second property state.

Item 5. The system of item 3 or 4 wherein, the illumination system is arranged to operate in first and second illumination modes, wherein, in the first illumination mode, the light tuning device is adjusted to provide substantially 0% of the incident light having the second property state to the spatial light modulator, such that only the first component output by the spatial light modulator contributes to the light beam, and in the second illumination mode, the light tuning device is adjustable to provide a selected proportion of incident light having the second property state, so that the second component output by the spatial light modulator contributes to the light beam.

Item 6. The system of item 5 further comprising: a controller arranged to adjust the light tuning device in the second illumination mode.

Item 7. The system of item 5 or wherein, in the second illumination mode, a holographic reconstruction of the hologram is formed by a Fourier transform lens in the path of the output light of the spatial light modulator.

Item 8. The system of any one of items 3 to 7 wherein the property is polarisation, and wherein the first property state corresponds to polarisation in a first direction and the second property state corresponds to polarisation in a second direction, wherein the second direction is perpendicular to the first direction.

Item 9. The system of item 8 further comprising: a light source arranged to provide light polarised in the second direction as the incident light to the spatial light modulator.

Item 10. The system of item 9 wherein the light tuning device changes the angle of polarisation of the incident light so that the incident light includes a component polarised in the first direction, and, preferably, both the first and second components output by the spatial light modulator contribute to the light beam.

Item 11. The system of item 8, 9 or 10 wherein the light tuning device comprises a half-wave plate, wherein the half-wave plate is rotatable to change the angle of polarisation of light.

Item 12. The system of any one of items 3 to 7 wherein the property is coherence, and wherein the first property state corresponds to incoherent light and the second property state corresponds to coherent light.

Item 13. The system of item 12 further comprising: a light source arranged to provide coherent light as the incident light to the spatial light modulator.

Item 14. The system of item 13 wherein, in a first illumination mode, the light tuning device changes substantially 100% of the coherent light from the light source to incoherent light.

Item 15. The system of item 13 or 14 wherein the light tuning device provides a selected proportion of the coherent light from the light source to the spatial light modulator.

Item 16. The system of any one of items 11 to 15 wherein the light tuning device is arranged to switch between providing coherent light and incoherent light over time.

Item 17. The system of any one of items 3 to 7 wherein the property is wavelength, and wherein the first property state corresponds to light of a first wavelength band and the second property state corresponds to light of a second wavelength band different from the first wavelength band.

Item 18. The system of item 17 further comprising: a light source arranged to provide light of the first wavelength band as the incident light to the spatial light modulator.

Item 19. The system of item 18 wherein the light tuning device is arranged to change a portion of the light of the first wavelength band to the second wavelength band so as to provide a selected proportion of light of the second wavelength band to the spatial light modulator.

Item 20. The system of item 1 wherein the control device comprises a spatial light modulator (SLM) control device arranged to adjust the allowable modulation levels of the hologram encoded on the spatial light modulator, and preferably is arranged to change a balance of the modulation scheme for the allowable modulation levels of the hologram.

Item 21. The system of item 20 wherein the SLM control device is arranged to change the distribution of allowable modulation levels of the hologram encoded on the spatial light modulator.

Item 22. The system of item 20 or 21 wherein the SLM control device is arranged to reduce the range of allowable modulation levels of the hologram encoded on the spatial light modulator, so that the modulation scheme is unbalanced.

Item 23. The system of item 20, 21 or 22 wherein the SLM control device is arranged to change the spacing between adjacent allowable modulation levels based on one or more of their modulation values.

Item 24. The system of item 23 wherein the spacing between adjacent allowable modulation levels is a function of one or more of their modulation values, and the SLM control device is arranged to adjust the function so as to change the proportion of light corresponding to the second component.

Item 25. The system of item 24 wherein the spacing between adjacent allowable modulation levels increases with increasing modulation value, such that more allowable modulation levels exist at lower modulation values than at higher modulation values.

Item 26. The system of any one of items 23 to 25 wherein the proportion of light corresponding to the second component output by the spatial light modulator is reduced by increasing the spacing between allowable modulation levels in proportion to the modulation value, so as to unbalance the modulation scheme.

Item 27. The system of any one of items 20 to 26 wherein the SLM control device is arranged to change a calculated set of modulation levels for a hologram, prior to encoding the hologram on the spatial light modulator.

Item 28. The system of item 27 wherein the SLM control device is arranged to reassign one or more of the calculated set of modulation levels to one or more other allowable modulation levels.

Item 29. The system of item 27 or 28 wherein the SLM control device is arranged to scale the calculated set of modulation levels based on a scaling factor and, optionally, based on an offset.

Item 30. The system of any one of items 20 to 29 wherein the SLM control device is arranged to change the voltage levels corresponding to each of the allowable modulation levels.

Item 31. The system of item 30 wherein the voltage levels are one of an analogue backplane voltage or a time-average bit plane voltage, and wherein the proportion of light corresponding to the second component output by the spatial light modulator is reduced by unbalancing the distribution of voltage levels corresponding to the allowable modulation levels.

Item 32. The system of any one of items 20 to 31 wherein the SLM control device is arranged to dynamically change the hologram to provide a proportion of output light that corresponds to the second component.

Item 33. The system of any preceding item, further comprising: projection optics arranged to project the light output by the spatial light modulator as the light beam for illuminating the scene.

Item 34. The system of item 33 wherein the projection optics comprises an optical element.

Item 35. The system of item 33 or 34 wherein the projection optics comprises an optical element arranged to receive light of one wavelength and output light of at least another wavelength, which is different from the wavelength of the received light.

Item 36. The system of item 35 wherein the optical element includes a phosphor material and the incident light comprises light of an excitation wavelength of the phosphor material, wherein the phosphor material emits light of a plurality of wavelengths when illuminated with light of the excitation wavelength.

Item 37. The system of item 36 wherein the excitation wavelengths correspond to blue or ultra violet light and the phosphor material emits a plurality of wavelengths corresponding to blue, green and red light.

Item 38. The system of any one of items 34 to 37 wherein the optical element is a reflector including a phosphor coating.

Item 39. The system of any preceding item wherein, in a second illumination mode, the light beam comprises a holographic image corresponding a hologram encoded in the spatial light modulator.

Item 40. The system of item 39 wherein the hologram is a computer-generated hologram.

Item 41. The system of item 39 or 40 wherein the hologram is selected or generated to provide a corresponding pattern of illumination.

Item 42. The system of any preceding item wherein the spatial light modulator is one or more of: a reflective spatial light modulator; a phase-only spatial light modulator, and an addressable liquid crystal on silicon (LCOS) spatial light modulator.

Item 43. A method for providing light illumination comprising: providing incident light to a spatial light modulator of an illumination system, wherein the spatial light modulator is arranged to output light comprising a first component and a second component, wherein the first component corresponds to incident light that is output without modulation by the spatial light modulator and the second component corresponds to incident light that is spatially-modulated according to a hologram and output by the spatial light modulator, and outputting light, by the spatial light modulator, for providing the illumination, the method further comprising: controlling the illumination system so that a proportion of the light output by the spatial light modulator corresponds to the second component.

Item 44. The method of item 43 wherein the illumination system comprises a light tuning device in the path of the incident light to the spatial light modulator, the method comprising: receiving, by the light tuning device, light having a property; providing, by the light tuning device in a first illumination mode, light having a first property state as incident light to a spatial light modulator, wherein substantially 0% of the light has a second property state different from the first property state; producing, by a spatial light modulator, output light in the first illumination mode, comprising only unmodulated light having the first property state as a first component of output light for providing the illumination.

Item 45. The method of item 44 further comprising: adjusting the light tuning device in a second illumination mode; in response to adjusting, providing, by the light tuning device, a proportion of light having the second property state as incident light to a spatial light modulator, and producing, by the spatial light modulator in the second illumination mode, light having the second property state modulated according to a hologram as a second component of output light for providing the illumination, wherein the output light comprises both the first component and the second component.

Item 46. The method of item 44 or 45 wherein the property is polarisation, and wherein the first property state corresponds to polarisation in a first direction and the second property state corresponds to polarisation in a second direction, wherein the second direction is perpendicular to the first direction, the method comprising: receiving, by a half-wave plate, light from the light source; providing, by the half-wave plate, light polarised in a first direction as incident light to a spatial light modulator, and outputting, by the spatial light modulator, the incident light polarised in the first direction unmodulated, as a first component of output light.

Item 47. The method of item 46 wherein the light from the light source is polarised in the first direction.

Item 48. The method of item 46 or 47 further comprising: adjusting the half-wave plate; additionally providing, by the half-wave plate, a proportion of the light polarised in a second direction as incident light to a spatial light modulator, wherein the second direction is perpendicular to the first direction; outputting, by the spatial light modulator, the incident light polarised in a second direction spatially-modulated according to a hologram as a second component of the output light.

Item 49. The method of item 48 further comprising: forming, by a Fourier transform lens in the path of the output light of the spatial light modulator, a holographic reconstruction corresponding to the hologram.

Item 50. The method of item 48 or 49 wherein adjusting the half-wave plate is in response to an indication to change the light illumination.

Item 51. The method of any one of items 43 to 50 further comprising: projecting the output light as a light beam.

Item 52. The method of item 51 wherein projecting the output light as a light beam for illuminating a scene comprises: receiving, by an optical element, the output light from the spatial light modulator, and projecting, by the optical element, the received light magnified to form the light beam for illuminating a scene.

Item 53. The method of item 52 further comprising: receiving, by the optical element, the output light from the spatial light modulator comprising light of a first wavelength, and projecting, by the optical element, light of at least a second wavelength, different from the first wavelength.

Item 54. The method of item 52 or 53 wherein the optical element comprises a phosphor material having an excitation wavelength, the method comprising: receiving, by the optical element, the output light from the spatial light modulator comprising light of the excitation wavelength; illuminating the phosphor material with the light of the excitation wavelength; emitting, by the phosphor material, visible light of a plurality of wavelengths, and projecting, by the optical element, light of the plurality of wavelengths.

Item 55. The method of item 54 wherein the excitation wavelengths correspond to blue or ultra violet light and the phosphor material emits a plurality of wavelengths corresponding to blue, green and red light.

Item 56. The method of any one of items 43 to 55 further comprising: in response to an indication to change the light illumination, dynamically changing a hologram encoded on the spatial light modulator.

Item 57. The method of any one of items 43 to 56 wherein the illumination system comprises a spatial light modulator (SLM) control device, wherein controlling the illumination system so that a proportion of the light output by the spatial light modulator corresponds to the second component comprises: adjusting, by the SLM control device, a balance of the modulation scheme for the allowable modulation levels of the hologram encoded on the spatial light modulator.

Item 58. The method of any one of items 43 to 57 wherein the illumination system comprises a spatial light modulator (SLM) control device, wherein controlling the illumination system so that a proportion of the light output by the spatial light modulator corresponds to the second component comprises: dynamically changing, by the SLM control device, the hologram encoded on the spatial light modulator to control a proportion of output light that corresponds to the second component.

Item 59. A computer program product comprising a computer readable medium having program instructions, which, when executed by a processor, perform the method of any one of items 43 to 58.

The invention claimed is:

1. An illumination system arranged to output a light beam for illuminating a scene, comprising:
a source of incident light;
a spatial light modulator arranged to receive the incident light from the source thereof, and to output light comprising a first component and a second component, the spatial light modulator being arranged to display a dynamically-changeable hologram,
wherein
the first component comprises incident light that is output without modulation by the spatial light modulator to provide the light beam for illumination of the scene, the incident light that is output without modulation having a first optical property state with respect to an optical property, and
the second component comprises incident light that is spatially-modulated according to the hologram displayed by the spatial light modulator and output by the spatial light modulator to contribute to the light beam, and thereby to contribute to the illumination of the scene, the incident light that is output with spatially-modulation being incident light having a second optical property state with respect to the optical property, the second optical property state being different from the first optical property state;
a light tuning device in the path of the incident light to the spatial light modulator; and
a control device operable to control the proportion of light output by the spatial light modulator that corresponds to the second component by adjusting the light tuning device to control a ratio of an intensity of incident light received by the spatial light modulator having the first property optical to an intensity of incident light received by the spatial light modulator having the second optical property state,
wherein
the illumination system is arranged to form a holographic reconstruction of the output light of the second component to provide the light contributing to the illumination of the scene, and
substantially no holographic reconstruction results from the output light of the first component; and
wherein the illumination system is arranged to operate in first and second illumination modes, wherein
in the first illumination mode, the light tuning device is adjusted such that the spatial light modulator receives incident light having a first ratio of intensity of light having the first optical property state to intensity of light having the second optical property state, and
in the second illumination mode, the light tuning device is adjusted such that the spatial light modulator receives incident light having a second ratio of intensity of light having the first optical property state to intensity of light having the second optical property state, the second ratio being greater than the first ratio, so that the second component output by the spatial light modulator contributes to the light beam.

2. The system of claim 1, wherein
in the first illumination mode, the light tuning device is adjusted to provide substantially 0% of the incident light received by the spatial light modulator having the second optical property state to the spatial light modulator, such that only the first component output by the spatial light modulator contributes to the light beam, and
in the second illumination mode, the light tuning device is adjustable to provide a selected proportion of intensity of incident light received by the spatial light modulator having the second optical property state.

3. The system of claim 2 wherein, in the second illumination mode, a holographic reconstruction of the hologram is formed by a Fourier transform lens in the path of the output light of the spatial light modulator.

4. The system of claim 1, further comprising
projection optics arranged to project the light output by the spatial light modulator as the light beam for illuminating the scene.

5. The system of claim 4 wherein the projection optics comprises an optical element arranged to receive light of one wavelength and output light of at least another wavelength, which is different from the wavelength of the received light.

6. The system of claim 1 wherein the optical property is polarisation, and wherein the first optical property state corresponds to polarisation in a first direction and the second optical property state corresponds to polarisation in a second direction, wherein the second direction is perpendicular to the first direction.

7. The system of claim 6, wherein the light tuning device is arranged to adjust the angle of polarisation of the incident light so as to adjust a ratio of incident light polarised in the first direction to incident light polarised in the second direction.

8. The system of claim 1 wherein the optical property is coherence, and wherein the first optical property state corresponds to incoherent light and the second optical property state corresponds to optical coherent light.

9. The system of claim 1 wherein the optical property is wavelength, and wherein the first optical property state corresponds to light of a first wavelength band and the second optical property state corresponds to light of a second wavelength band different from the first wavelength band.

10. A method for providing light illumination comprising:
providing incident light from a source thereof to a spatial light modulator of an illumination system, wherein
the incident light received by the spatial light modulator has a ratio of an intensity of light having a first optical property state with respect to an optical property to an intensity of light having a second optical property state with respect to the optical property, the second optical property state being different from the first optical property;
outputting light, by the spatial light modulator, for providing the illumination, the output light comprising a first component and a second component, wherein
the spatial light modulator modulates incident light having the second optical property state without substantially modulating incident light having the first optical property state to output light comprising
the first component corresponding to incident light of the first optical property state that is output without modulation by the spatial light modulator to provide the light beam for illumination of the scene, and
the second component corresponding to incident light having the second optical property state that is spatially-modulated according to a hologram displayed by the spatial light modulator and output by the spatial light modulator to contribute to the light beam, and thereby to provide light contributing to the illumination of the scene, wherein the hologram is dynamically changeable; and
performing a holographic reconstruction of the output light of the second component to provide the light contributing to the illumination of the scene, wherein substantially no holographic reconstruction results from the output light of the first component that provides the light beam for illumination of the scene,
the method further comprising:
controlling the illumination system by adjusting a ratio of intensity of incident light received by the spatial light modulator having the first optical property state to intensity of incident light received by the spatial light modulator having the second optical property state to adjust a proportion of the light output by the spatial light modulator corresponding to the second component, such that the illumination system
operates in a first illumination mode, in which the illumination system is controlled such that the spatial light modulator receives incident light having a first ratio of intensity of light having the first optical property state to intensity of light having the second optical property state, and
operating in a second illumination mode, in which the illumination system is controlled such that the spatial light modulator receives incident light having a second ratio of intensity of light having the first optical property state to intensity of light having the second optical property state, the second ratio being greater than the first ratio, so that the second component output by the spatial light modulator contributes to the light beam.

11. The method of claim 10 further comprising: in response to an indication to change the light illumination, dynamically changing the hologram displayed by the spatial light modulator.

12. The method of claim 10, wherein
in the first illumination mode, the ratio of intensity of incident light received by the spatial light modulator having the first optical property state to intensity of incident light received by the spatial light modulator having the second optical property state is adjusted such that substantially 0% of the incident light has the second optical property state, such that only the first component output by the spatial light modulator substantially contributes to the light beam, and
in the second illumination mode, the ratio of intensity of incident light received by the spatial light modulator having the first optical property state to intensity of incident light received by the spatial light modulator having the second optical property state is adjusted to provide a selected proportion of incident light having the second optical property state.

13. The method of claim 10 wherein the optical property is polarisation, and wherein the first optical property state corresponds to polarisation in a first direction and the second optical property state corresponds to polarisation in a second direction, wherein the second direction is perpendicular to the first direction.

14. The method of claim 10 wherein the optical property is coherence, and wherein the first optical property state corresponds to incoherent light and the second optical property state corresponds to coherent light.

15. The method of claim 10 wherein the optical property is wavelength, and wherein the first optical property state corresponds to light of a first wavelength band and the second optical property state corresponds to light of a second wavelength band different from the first wavelength band.

16. An illumination system arranged to output a light beam for illuminating a scene, comprising:
a spatial light modulator arranged to receive incident light, and to output light comprising a first component and a second component; and
a control device operable to control the proportion of light output by the spatial light modulator that corresponds to the second component by controlling a ratio of an intensity of incident light received by the spatial light modulator having a first optical property state with respect to an optical property to an intensity of incident light received by the spatial light modulator having a second optical property state with respect to the optical property, the second optical property state being different from the first optical property state,
wherein
the first component of the output light comprises incident light having the first optical property state that is output without modulation by the spatial light modulator to provide the light beam for illumination of the scene, and
the second component of the output light comprises incident light having the second optical property state that is spatially-modulated according to a hologram displayed by the spatial light modulator and output by the spatial light modulator to contribute to the light beam, and thereby to contribute to the illumination of the scene;

wherein the hologram is dynamically changeable;

wherein
- the optical system is arranged to form a holographic reconstruction of the output light of the second component to provide the light contributing to the illumination of the scene, and
- substantially no holographic reconstruction results from the output light of the first component; and wherein the illumination system is arranged to operate in first and second illumination modes, wherein
- in the first illumination mode, the control device is adjusted such that the spatial light modulator receives incident light having a first ratio of intensity of light having the first optical property state to intensity of light having the second optical property state, and
- in the second illumination mode, the control device is adjusted such that the spatial light modulator receives incident light having a second ratio of intensity of light having the first optical property state to intensity of light having the second optical property state, the second ratio being greater than the first ratio, so that the second component output by the spatial light modulator contributes to the light beam.

* * * * *